(12) United States Patent
Nuutinen

(10) Patent No.: US 6,865,681 B2
(45) Date of Patent: Mar. 8, 2005

(54) VOIP TERMINAL SECURITY MODULE, SIP STACK WITH SECURITY MANAGER, SYSTEM AND SECURITY METHODS

(75) Inventor: Mikko Nuutinen, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 726 days.

(21) Appl. No.: 09/752,142

(22) Filed: Dec. 29, 2000

(65) Prior Publication Data

US 2002/0129236 A1 Sep. 12, 2002

(51) Int. Cl.[7] .................. G06F 11/30; G06F 12/14; H04L 9/00; H04L 9/32
(52) U.S. Cl. .............. 713/201; 713/151; 379/395.6
(58) Field of Search .................. 713/201, 151; 379/395.6

(56) References Cited

U.S. PATENT DOCUMENTS

2002/0102999 A1 * 8/2002 Maggenti et al. ........... 455/518

OTHER PUBLICATIONS

"Signaling fir Internet Telephony" by H. Schulzrinne et al Proceedings of the Int. Conf. on Network Protocols, Feb. 2, 1998.*

ITU-T H. 323, Series H: Audiovisual and Multimedia Systems, "Infrastructure of Audiovisual Services—Systemsnand Terminal Equipment for Audiovisual Services", "Packet–Based Multimedia Communications Systems", Feb. 1998.

IETF RFC 2543, "SIP: Session Initiation Protocol", Handley et al, Nov. 24, 2000.

"Signaling for Internet Telephony" by H. Schulzrinne et al Proceedings of the Int. Conf. on Network Protocols, Oct. 1998, pp. 1–27.

Internet Engineering Task Force Internet Draft Document: draft–sinnreich–aaa–interdomain–sip–qos–osp–00.txt Jul. 2000; Expires Jan. 2001; "AAA Usage for IP Telephony with Qos" H. Sinnreich et al.

* cited by examiner

Primary Examiner—Gilberto Barron
Assistant Examiner—Joseph McArdle

(57) ABSTRACT

A secure voice over internet protocol (VoIP) terminal includes a modular security manager for use in conjunction with a protocol stack thereof, wherein the security manager includes a plurality of interfaces to the stack. In an SIP embodiment, these may include a security stack interface (SSA) between an SIP manager of an SIP stack and the security manager, a security terminal interface (SST) between a telephony application and the security manager, a security media interface (SSM) between the security manager and a media controller, and a security manager application interface (SMA) between the security manager and a security application (PGP) outside the stack.

8 Claims, 15 Drawing Sheets

VOIP TERMINAL SECURITY MODULE, SIP STACK WITH SECURITY MANAGER, SYSTEM AND SECURITY METHODS

TECHNICAL FIELD

The present invention relates to internet telephony (VoIP) and, more particularly, to providing for a secure VoIP terminal.

DISCUSSION OF RELATED ART

In the last few years, the internet has become a feasible infrastructure for supporting various multimedia services. These include interactive services such as IP telephony, also known as Voice over Internet Protocol (VoIP). VoIP can be defined as the transport of telephony calls over an IP network. In contrast to traditional telephony, where an end-to-end circuit is set up between two endpoints, IP telephony uses the internet protocol to transmit voice packets over an IP network. The addition of voice to the data network also generates new possibilities, such as new integrated services that are not used over a traditional circuit switched network, i.e. data and video communication. Over public networks, like the internet, the benefits of IP telephony are currently limited by the marginal support for Quality of Service (QoS), inadequate traffic management and the lack of security. Thus there are still some technical issues to be improved to ensure comparable usability with Public Switched Telephone Network (PSTN).

VoIP security is one of the major technical issues that has to be defined before VoIP could be used in public networks like the internet. Internet telephony users do not want that calls could be listened in or sensitive information, like phone numbers, passwords or credit card numbers, to be revealed to an unintended party. Thus not only the audio stream needs protection, but the control signalling requires to be secured as well.

There are currently two competing standardized protocols for VoIP operation, ITU-T's H.323 and IETF's Session Initiation Protocol. These two protocols describe signalling and the control of multimedia conferences over packet based networks by different ways. H.323 is a part of a larger series of communication standards called the H.32x series and consist of many subprotocols. SIP is a less complex text based client server protocol. At the moment SIP seems to be the major VoIP protocol for future services. However H.323 has the advantage of better interoperability with PSTN and due longer development K has also many corporations backing it. There are many discussions and controversial predictions as to which approach will survive. Although both standards may co-exist, only SIP is considered here.

Although SIP is specified quite well, it lacks a good specification of security. See Sections 13–15 of IETF RFC 2543 "SIP: Session Initiation Protocol" by Handley et al. The present invention concerns a suitable solution for a secure VoIP terminal.

DISCLOSURE OF INVENTION

According to a first aspect of the present invention, a modular component for use in conjunction with a protocol stack of a voice over internet protocol terminal comprises a security manager, a security stack interface (SSA) for interfacing between said security manager and a protocol manager of said protocol stack, a security terminal interface (SST) for interfacing between said security manager and an application layer, a security media interface (SSM) for interfacing between said security manager and a media controller, and a security manager application interface (SMA) for interfacing between said security manager and a security application (PGP) outside said stack.

Further according to the first aspect of the invention, the security manager comprises a state machine having an idle state and a wait for authorization state.

Further still according to the first aspect of the invention, a transition to said wait authorization state from said idle state occurs in response to an unauthorized invitation received and signaled from and to an initiating remote device wherein a transition from said wait authorization state to said idle state occurs in response to an authorized invitation.

According to a second aspect of the invention, a session initiation protocol (SIP) signaling stack for a voice over internet protocol (VoIP) terminal device, said stack having an application interface and a media interface to a telephony application and having a protocol interface to a network layer, said stack comprises an SIP manager having said application interface and a media controller having said media interface to said telephony application and said protocol interface between said network layer and both said SIP manager and said media controller, and a security manager having a plurality of interfaces to said SIP manager, said telephony application, and to said network layer.

Further according to the second aspect of the invention, the plurality of interfaces includes a security stack interface (SSA) between said SIP manager and said security manager, a security terminal interface (SST) between said telephony application and said security manager, a security media interface (SSM) between said security manager and said media controller, a security manager application interface (SMA) between said security manager and a security application (PGP) outside said stack.

According to a third aspect of the invention, a method comprises the steps of sending an invite signal from a session initiation protocol (SIP) stack of a sending terminal to a remote user agent (UA), receiving an unauthorized signal (401_Unauthorized) at said SIP stack from said remote UA indicating authorization is required, providing an indication signal got_401_unauthorized) from said SIP stack to a security manager module of said sending terminal indicative of receipt of said unauthorized signal, providing an authenticate signal (send_www_authenticate) with required information and authorization header field from said security manager module to said SIP stack, calling encryption and authorization function requests from said SIP stack to said security manager, encrypting and authorizing said required Information, and sending an authorized invite signal from said SIP stack to said remote UA.

According to a fourth aspect of the invention, a method comprises the steps of receiving an invite signal from a remote user agent (UA) at a session initiation protocol (SIP) stack of a receiving terminal, providing a signal indicative of receipt of said invite signal from said SIP stack to a security manager module of said receiving terminal for checking security parameters of said invite signal, providing an authenticate signal (send_www_authenticate) from said security manager to said SIP stack, sending an unauthorized signal (401_unauthorized) from said SIP stack to said remote UA, receiving an authorized invite signal from said remote UA to said SIP stack, providing a request to authenticate said authorized invite signal to said security manager module, checking parameters of said authorized invite signal by said security manager module, and providing an authentication signal from said security manager module to said SIP stack indicative of said step of checking.

According to a fifth aspect of the invention, a telecommunications system comprises a sending terminal for sending an invite signal from a session initiation protocol (SIP) stack of a sending terminal, and a receiving terminal responsive to said invite signal for providing a signal indicative of receipt of said invite signal from said SIP stack to a security manager module of said receiving terminal for checking security parameters of said invite signal, wherein said security manager provides an authenticate signal to said SIP stack and said SIP then sends an unauthorize signal to said sending terminal in the presence of an unauthorized invite signal from said sending terminal, wherein said SIP stack of said sending terminal is responsive to said unauthorized signal from said receiving terminal indicating authorization is required, and wherein said sending terminal provides an indication signal from said SIP stack of said sending terminal to a security manager module of said sending terminal indicative of receipt of said unauthorize signal, wherein said security manager provides an authenticate signal with required information and authorization header field to said SIP stack of said sending terminal, wherein said SIP stack of said sending terminal sends an authorized invite signal to said receiving terminal, wherein said receiving terminal receives said authorized invite signal from said sending terminal at said SIP stack of said receiving terminal, wherein said SIP stack provides a request to authenticate said authorized invite signal to said security manager module of said receiving terminal, wherein said security manager checks parameters of said authorized invite signal and provides an authentication signal to said SIP stack of said receiving terminal indicative of said step of checking.

The solution provides the required security capabilities. A modular design is provided and only minor changes to the lower layer of the stack are needed to connect the security manager with the stack. The interaction between the stack and the security module occurs by means of five signals and four interface functions. The major benefit of this kind of architecture is that the call control stack is not changed and only valid calls proceed to the stack, while all authentication and security functions are done at the lower level.

BEST MODE FOR CARRYING OUT THE INVENTION

I. Session Initiation Protocol (SIP)

Figure 1:
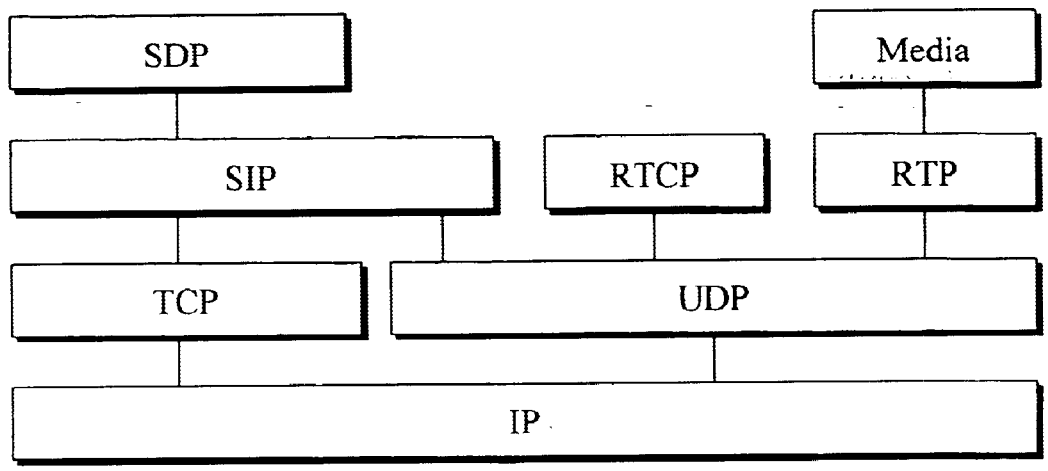
FIG. 1 shows the SIP protocol stack, according to the prior art.

The Session Initiation Protocol (SIP) is a text-based client-server protocol, similar to HTTP and SMTP. SIP is an application-layer signalling protocol that handles the association between internet end systems by creating, modifying and terminating multimedia sessions. Members participating in a multimedia session can communicate via multicast or via a mesh of unicast relations, or a combination of these. SIP is developed by IETF's MMUSIC working group and the SIP working group is chartered to continue the development.

A. SIP Architecture (i) Terminals

Terminals or user agents are client endpoints able to receive and place calls. The endpoints generate and receive bi-directional real-time information streams. A terminal can either be a software run in a personal computer or a dedicated hardware appliance. The terminal must support voice communications, whereas video and data are optional.

The SIP user agent has two basic functions.

1. The User Agent Server (UAS) is a server application that contacts the user when a SIP request is received and that returns a response on behalf of the user.

2. The User Agent Client (UAC) is a client application that initiates a SIP request.

(ii) SIP Network Elements

There are different types of servers: proxy, redirect, location, registrar and UASs. Servers are mainly used to route and redirect calls. A SIP server can operate in either proxy or redirect mode, depending on how the next-hop server is connected and if the user is not located on the contacted server. A redirect server informs the caller to contact another server directly. A proxy server contacts one or more next-hop servers itself and passes the call requests further.

(iii) Proxy Server

A proxy is an intermediate entity that acts as both a server when receiving requests and a client for the purpose of making requests on behalf of the other clients. The requests are passed on, possibly after translation, to other servers. A proxy can be a very simple stateless packet forwarder or it can be a complex statecapable proxy. A stateless proxy forgets all the information it has received once an outgoing request has been generated. Stateless proxy is always based on UDP, whereas a state-capable proxy is usually based on TCP. Statecapable proxy acts as a virtual user agent and implements the server state machine when receiving requests and the client state machine for generating outgoing requests. A proxy should implement loop detection by always checking whether its own address is on the list of a Via header field in order to prevent loops.

(ii)(b) Redirect Server

A redirect server only informs the caller about the next-hop, and the caller sends a new request to the suggested receiver directly. After receiving a SIP request, a redirect server maps the address into zero or more new addresses and returns these addresses to the client. Now the client can contact the next server directly. Unlike a proxy server, a redirect server does not initiate its own SIP request and unlike an user agent it does not accept calls.

(ii)(c) Location Server

A SIP system may also include a location server, that keeps a database of the locations of the users. A location server is used by a redirect or proxy server to obtain information about the called party's possible location. The location server is typically co-located with a SIP proxy but it may also be co-located with another SIP server.

(ii)(d) Registrar

A registrar is a server that accepts REGISTER requests, by which users can register their location with SIP servers. A registrar is typically co-located with a proxy or redirect server and may offer location services.

B. Protocols Involved in SIP

Basically SIP is rather independent of the environment and can be used in conjunction with several transfer protocols. It does not require any specific transfer protocol but it is recommended that servers should support both UDP and TCP. The Session Description Protocol (SDP) is used by SIP for description of the capabilities and media types supported by the terminals. Text based SDP messages, which are sent in SIP message bodies, lists the features that must be supported by the terminals. The real time data is transferred by RTP in conjunction with RTCP. SIP protocol stack in an internet environment is described in FIG. 1.

C. SIP Addressing

For addressing SIP uses an email-like identifier (SIP URL) in the form sip: user@host, where the user part is a user name or phone number and the host part is either domain or a numeric network address. In many cases the email-like name may be the same as user's email address and can be easily mapped. The address may also be used for group of individuals so that it specifies the first available person from the group or the whole group.

D. SIP Message Structure

SIP is a client-server protocol, message is either a request from a client to a server, or a response from a server to a client. Requests and responses are in textual form and include different header fields to describe the details of the communication. SIP reuses many of the header fields used in HTTP (Hypertext Transfer Protocol), such as entity and authentication headers. Message begins with a start-line followed by one or more header fields. After the header-fields the message may contain body which is separated from the header fields by an empty line.

(i) Request Messages

As in HTTP, the client requests invoke methods on the server. The request message consist of a start-line specifying the method and the protocol, a number of header fields specifying the call properties and service information, and an optional message body. The following methods are used in SIP.

REGISTER: conveys location information to a SIP server

INVITE: invites user to a session or a conference

ACK: is used in reliable message exchanges for acknowledgement

CANCEL: cancels a pending request

BYE: terminates a connection between two users

OPTIONS: signals information about capabilities

All requests, except REGISTER, must be supported by the SIP proxy, redirect and user agent servers as well as by clients. Support for the REGISTER request is optional.

(ii) Response Messages

A server responses to the requests with a response message. The syntax of the response code is similar to HTTP. The three digit codes are hierarchically organized, with the first digit representing the result class and the other two digits providing additional information. The first digit controls the protocol operation and the other two gives useful but not critical information. SIP entities do not need to understand the meaning of all registered response codes, but they must be able to recognize the class of the response and treat any unrecognized response as being the x00 response code of the class. The following response codes are used in SIP.

1xx: Informational—request received, call in progress, continuing to process the request (These responses are always followed by other responses indicating the final result.)

2xx: Success—the action was successfully received, understood, and accepted

3xx: Redirection—further action needs to be taken in order to complete the request 4xx: Client Error—the request contains bad syntax or cannot be fulfilled at this server 5xx: Server Error—the server failed to fulfil an apparently valid request 6xx: Global Failure—the request cannot be fulfilled at any server Responses are always sent back to the entity that sent the message to the server, not to the originator of the request. The message is repeated regularly until the destination acknowledges with an ACK message. A positive response to a setup message also contains a session description, describing the supported media types. Call identifiers are used to indicate messages belonging to the same conference.

(iii) Header Fields

Requests and responses include header fields to specify parameters such as caller, called party, type and length of the message body. Currently there are 37 different header fields defined, but a SIP entity does not need to understand all of these header fields, although it is desirable. The header-fields, which are not understood, can just be ignored.

Header fields can be divided into four different groups as shown in Table 1 below:

TABLE 1

| General header fields | Entity header fields | Response header fields | Request header fields |
| --- | --- | --- | --- |
| Accept | Content-Encoding | Allow | Authorization |
| Accept-Encoding | Content-Length | Proxy-Authenticate | Contact |
| Accept-Language | Content-Type | Retry-After | Hide |
| Call-ID | | Server | Max-Forwards |
| Contact | | Unsupported | Organization |
| Cseq | | Warning | Priority |
| Date | | WWW-Authenticate | Proxy-Authorization |
| Encryption | | | Proxy-Require |
| Expires | | | Route |

TABLE 1-continued

| General header fields | Entity header fields | Response header fields | Request header fields |
|---|---|---|---|
| From Record-Route Timestamp To Via | | | Require Response-Key Subject User-Agent |

The first group consists of general header fields that are used in both requests and responses. Entity header fields contain information about the message body or, if no body is present, the resources identified by the request. Request header fields again act as request modifiers and allow the client to pass additional information to the server. The fourth group is response header fields, which allow the server to pass additional information about the response that cannot be placed in the response status-line.

E. Session Description Protocol (SDP): RFC 2327

When the users are invited to multimedia conferences, SIP states how communication between the caller and the called party, addressing and user location resolving is done. Furthermore, there is a need to describe the context of a multimedia session. The sessions are typically described using the SDP, although other protocols can also be used. The session description is contained in the message body. The SDP conveys information about media streams in multimedia sessions giving the recipients of the session description enough information to participate in the session.

An SDP session description consists of a number of text lines containing type-value pairs. The type is always exactly one case-significant character and the value is a structured text string whose format depends on type. Some lines in each description are required and some are optional but all must appear in exactly the order given in Table 2 below. Optional items are marked with a'*'.

TABLE 2

| Session description | | | |
|---|---|---|---|
| Type | Description | k*<br>a* | Encryption key<br>Zero or more session attribute lines |
| v | Protocol version | | Time Description |
| o | Owner/creator and session identifier | t | Time the session is activated |
| s | Session name | r* | Zero or more repeat times |
| i* | Sesson information | | Media description |
| u* | URI of description | m | Media name and transport address |
| e* | Email address | i* | Media title |
| p* | Phone number | c* | Connection information - optional if included at session level |
| c* | Connection information - not required if included in all media | b* | Bandwidth information |
| b* | Bandwidth information | k* | Encryption key |
| z* | Time zone adjustments | a* | Zero or more media attributes |

F. Example SIP Message

An example INVITE-request message from user bob@firm.com to pete@company.com is represented here. The first line is the request line beginning with method token followed by request-URI and protocol version. After the first row other headers follow. Content-type informs that the message contains SDP session description, which consists of the one letter codes at the end of the message. The session description tells that tenninal wants to use RTP in port 5004 with formats 0, 3 or 5.

```
INVITE sip:pete@company.com SIP/2.0
Via: SIP/2.0/UDP user.firm.com
From: Bob <sip:bob@firm.com>
To: Pete <sip:pete@company.com>
Call-ID: 1234567890@user.firm.com
Cseq: 1 INVITE
Subject: Document
Content-Type: application/sdp
Content-Length: 109
v=0
o=Bob 53655765 2353687637 IN IP4 123.56.43.23
s=call
c=IN IP4 user.firm.com
m=audio 5004 RTP/AVP 0 3 5
```

The request is responded with a response message, which is very similar to the request message. The first row contains response code (200=success). The response SDP tells that formats 0 and 3 are accepted.

```
SIP/2.0 200 OK
Via: SIP/2.0/UDP sip.company.com
Via: SIP/2.0/UDP user.firm.com
From: Pete <sip:pete@company.com>
To: <sip:bob@firm.com>
Call-ID: 1234567890@user.firm.com
Cseq: 1 INVITE
Content-Type: application/sdp
Content-Length: 103
v=0
o=Peter 4858949 4858949 IN IP4 198.51.4.43
s=OK
c=IN IP4 user.company.com
m=audio 5004 RTP/AVP 0 3
```

G. SIP Operation (i) Basic Operation

Figure 2:
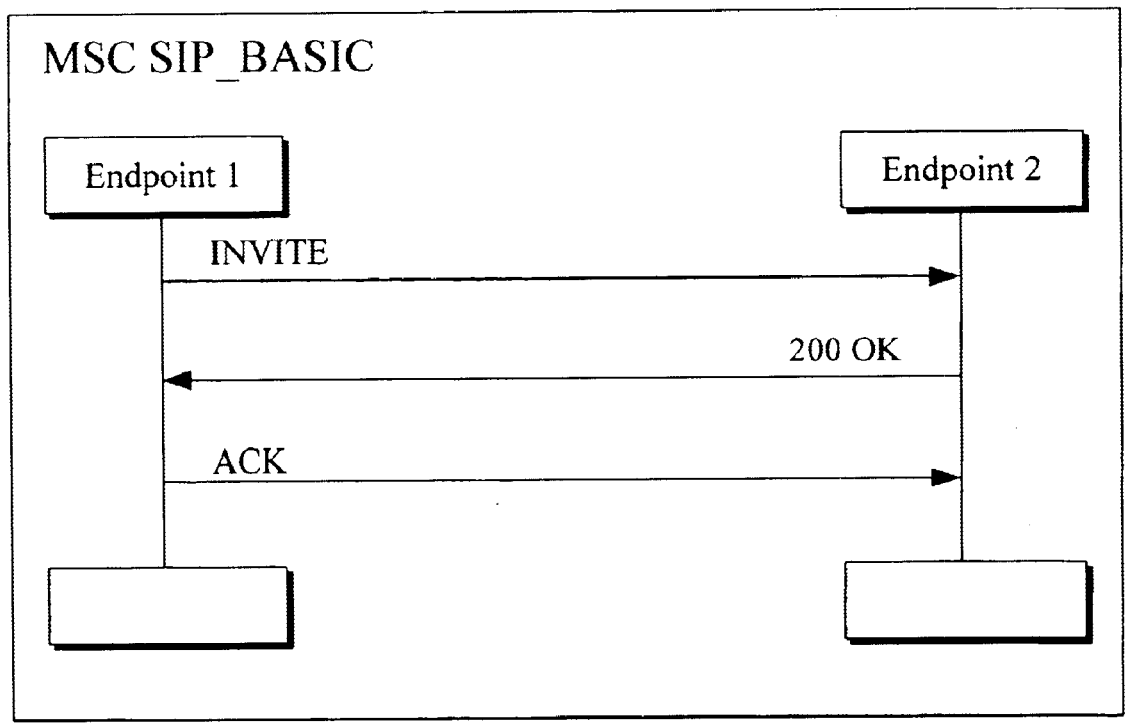
FIG. 2 shows SIP basic operation, according to the prior art.

The basic operation (FIG. 2) of SIP is very simple. First endpoint 1 invites endpoint 2 with INVITE message containing session description. The called party, endpoint 2 agrees to communicate and responds 200 OK with accepted call parameters. After receiving acceptation, endpoint 1 sends ACK message to confirm that it has received the response.

Normally transfer includes also other network components and SIP operates either in proxy- or in redirect server mode. Both of these operation modes are described below.

Figure 3:
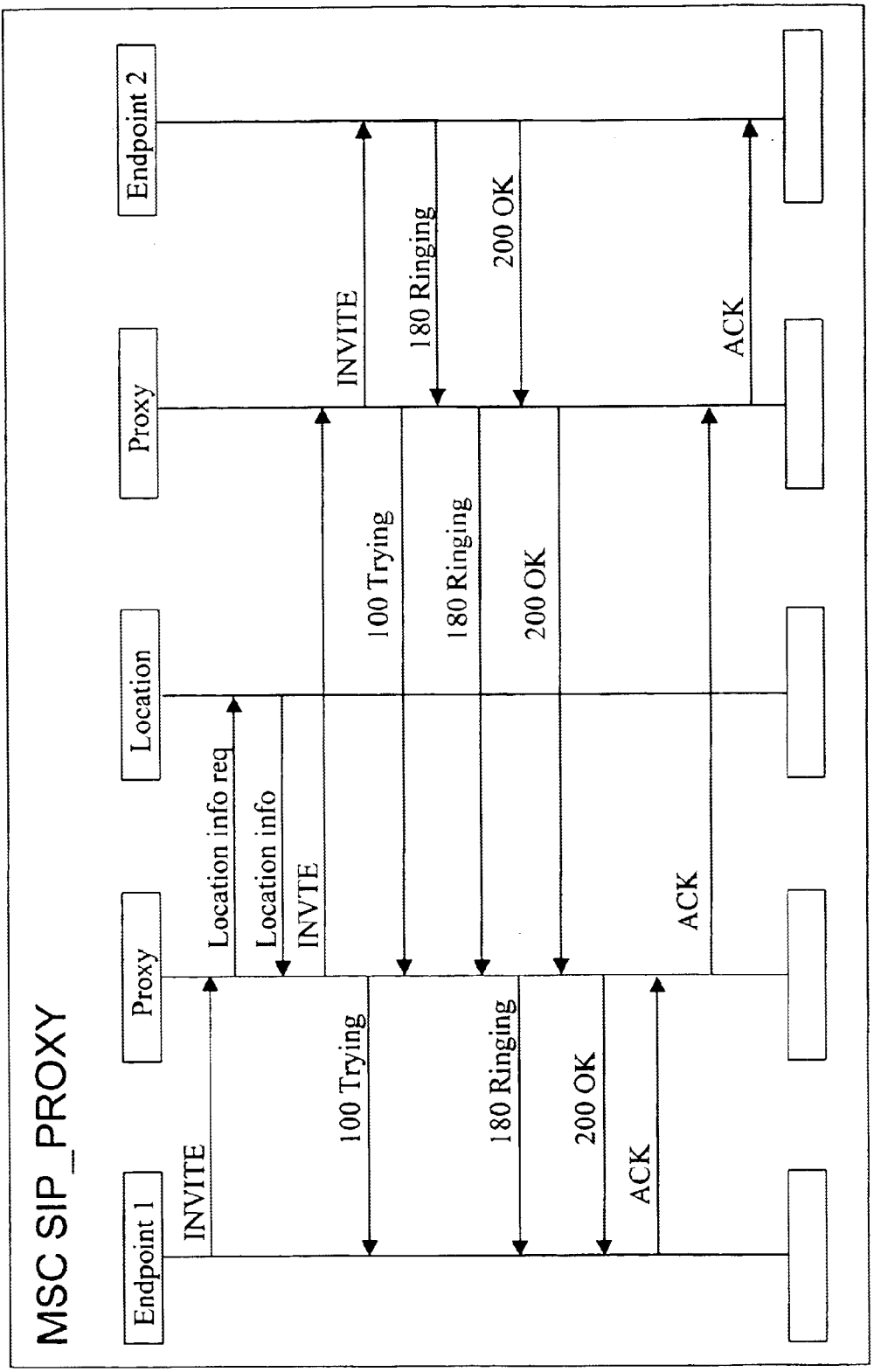
FIG. 3 shows SIP proxy server operation, according to the prior art.

In the proxy server operation mode (FIG. 3) an INVITE request is generated and sent to the proxy server. The server accepts the invitation and contacts its location server for a more precise location. The location server returns the location of the endpoint 2. The proxy sends an INVITE request to the address given by the location server where the proxy2 forwards the invite to the endpoint 2. The endpoint 2 alerts (180 Ringing) and is willing to accept the call. The 200 OK response is returned to the proxy server. The proxy server then forwards the response to the endpoint 1. The endpoint 1 confirms the response with an ACK request. The proxy server forwards the request to the endpoint 2.

Figure 4:
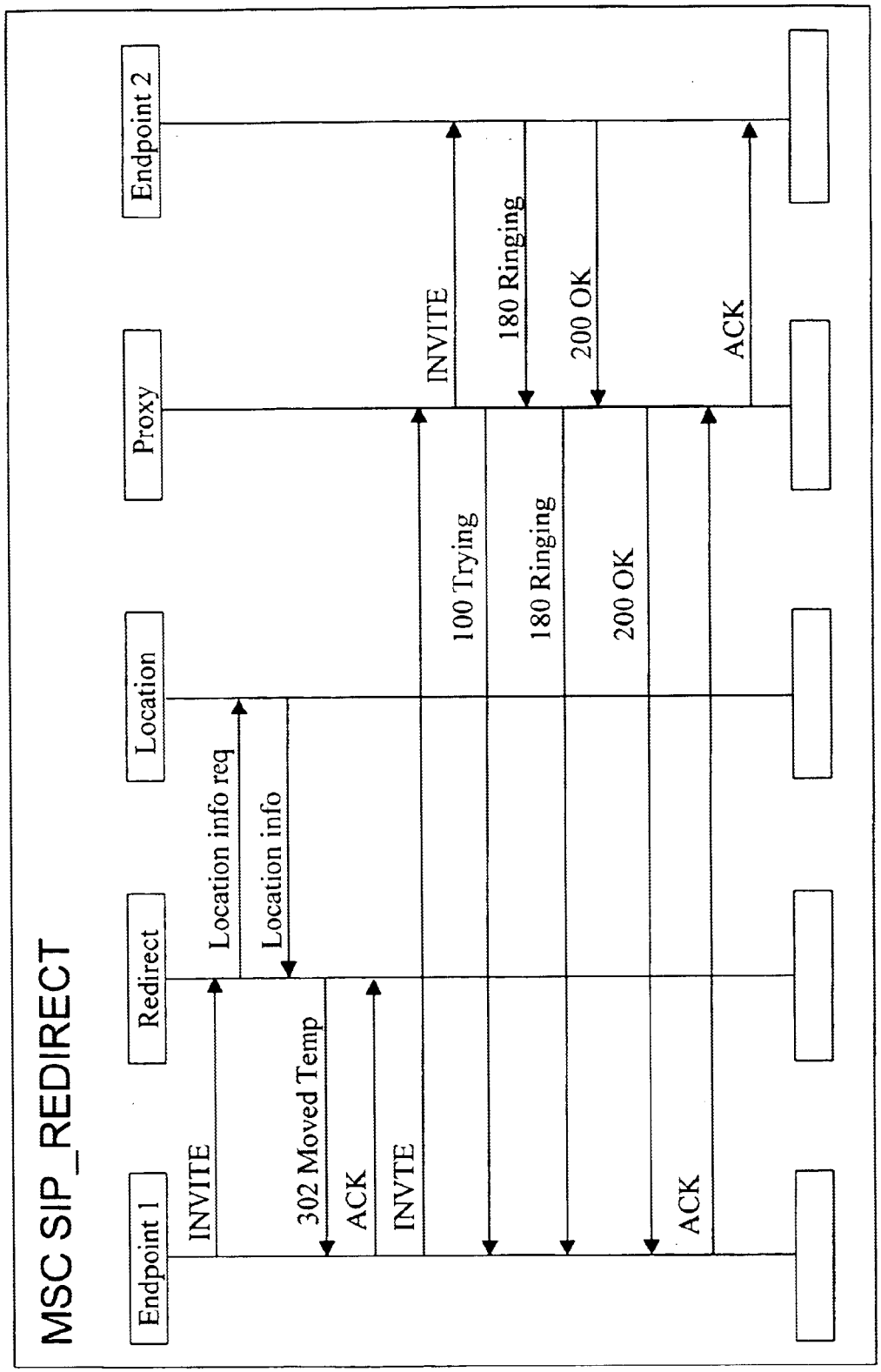
FIG. 4 shows SIP redirect server operation, according to the prior art

The first steps are the same for both proxy and redirect server. In the case of a redirect server (FIG. 4), a redirection response (302=moved temporarily) is sent back to endpoint 1. Endpoint 1 acknowledges the response with an ACK. The endpoint 1 creates a new INVITE request, which is sent to the address given by the redirect server. Now the call succeeds and the endpoint 2 sends the response 200 OK to the endpoint 1. The signalling is completed with an ACK request to the endpoint 2.

II. Security

A. Security Objectives

When considering information security, all parties involved in a transaction must have confidence that certain objectives associated with information security have been met. Some of these objectives are listed in Table 3 below:

TABLE 3

| | |
|---|---|
| Access Control | Restricting access to resources to privileged entities |
| Authentication | Corroboration of the identity of an entity or the source of information (data origin authentication) |
| Authorization | Conveyance, to another entity, of official sanction to do or be something |
| Anonymity | Concealing the identity of an entity involved in some process |
| Availability | Accessibility of systems and information by authorized users |
| Certification | Endorsement of information by a trusted entity |
| Confidentiality or Privacy | Keeping information secret from all but those who are authorized to see it |
| Confirmation | Acknowledgement that services have been provided |
| Data integrity | Ensuring information has not been altered by unauthorized or unknown means |
| Non-repudiation | Preventing the denial of previous commitments or actions |
| Ownership | A means to provide an entity with the legal right to use or transfer a resource to others |
| Receipt | Acknowledgement that information has been received |
| Revocation | Retraction of certification or authorization |
| Signature | A means to bind information to an entity |
| Timestamping | Recording the time of creation or existence of information |
| Validation | A means to provide timeliness of authorization to use or manipulate information or resources |
| Witnessing | Verifying the creation or existence of information by an entity other than the creator |

Authentication, integrity, confidentiality, non-repudiation, access control and availability form a framework upon which the others will be derived.

(i) Authentication

Authentication, property by which the correct identity of an entity, such as a user or a terminal, or the originality of a transmitted message is established with a required assurance. Authentication can be divided into two classes, which are peer entity authentication and data origin authentication. Peer entity authentication assures that the communicating parties are who they claim to be. Data origin authentication assures that a message has come from a legitimate and authenticated source. Authentication is typically needed to protect against masquerading and modification. Typical ways to provide authentication are message authentication codes, digital signatures and certificates.

(ii) Integrity

Integrity means avoidance of the unauthorized modification of information. Integrity is an important security service that proves that transmitted data has not been tampered with. Authenticating the communicating parties is not enough if the system cannot guarantee that a message has not been altered during transmission. Data manipulation may be detected and protected by using hash codes, digital signatures and certificates.

(iii) Confidentiality

Confidentiality is avoidance of the disclosure of information without the permission of its owner. Secrecy and privacy are terms synonymous to confidentiality. Confidentiality may be ensured with encipherment of the messages.

(iv) Non_Repudiation

Non-repudiation, property by which one of the entities or parties in a communication cannot deny having participated in the whole or part of the communication. Non-repudiation prevents an entity from denying something that actually happened. Usually this refers to situation where an entity has used a service, or transmitted a message, and later claims not having done so. Digital signatures and certificates are used to provide non-repudiation.

(v) Access Control

Access Control is the prevention of unauthorized use of a resource. Access control is closely related to authentication, which gives the ability to limit and control access to network systems and applications. An entity must first be authenticated, before granting access to the system. Also access control lists may be used.

(vi) Availability

Availability means the accessibility of systems and information by authorized users. It is closely related to authentication and access control. An authenticated entity must have access to a system and on the other hand unauthorized entity must not prevent the usability of the system (Denial of service attacks).

B. Security Mechanisms

In this chapter some security mechanisms, cryptographic techniques and hash functions are described. Also some security protocols and applications are represented.

(i) Encryption

Figure 5:
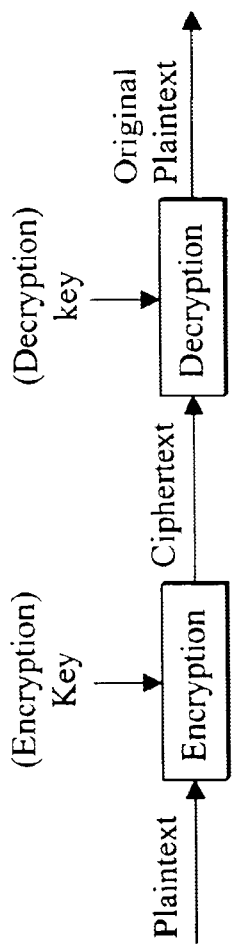
FIG. 5 shows an encryption process, according to the prior art.

A mechanism to secure information so that only receiver can use it is called encryption. In encryption, a cleartext message (plaintext) is hidden by using cryptographic techniques, the resulting message is called ciphertext. The receiver recovers the original plaintext by decrypting the ciphertext. A key is a mathematical value that modem cryptographic algorithms make use of when encrypting or decrypting a message. Some algorithms use different keys for encryption and decryption (FIG. 5).

Cryptographic techniques are not only used to provide confidentiality, but also other services, like authentication, integrity and non-repudiation may be provided. Cryptographic techniques are typically divided into two generic types: symmetric key and asymmetric key techniques.

(a) Symmetric Encryption

In symmetric encryption the key can be calculated from the decryption key and vice versa. In most cases both keys are the same one and the mechanism is called secret key or single key encryption. The security in symmetric key encryption rests in the key, which must be agreed before any communication. As long as the communication needs to remain secret, the key must be secret, divulging the key means that anyone could encrypt and decrypt the messages.

The Data Encryption Standard (DES) is currently the most widely used symmetric encryption scheme. DES is a symmetric block cipher that processes 64-bit blocks of plaintext producing 64-bit blocks of ciphertext The key length is 64 bits, but since every eighth bit (8, 16, . . . , 64) is a parity bit for error detection, the effective key length is 56 bits.

The strength of 56-bit DES has been questioned over the time. To improve security, multiple encipherment can be applied to a message. Triple DES (3DES) is a commonly used algorithm that provides stronger encryption than plain DES. In 3DES, three consecutive DES operations are applied to a message block.

Another symmetric encryption scheme is Intentional Data Encryption Algorithm (IDEA). IDEA is best known as the block cipher algorithm used within the popular encryption program PGP. IDEA encrypts 64-bit plaintext to 64-bit ciphertext blocks, using a 128-bit input key. IDEA uses 52 subkeys, each 16 bits long. Two are used during each round proper, and four are used before every of the eight rounds and after the last round. IDEA is believed to be a strong algorithm and no practical attacks on it have been published.

RC2 and RC4 are variable key size symmetric cipher functions. They were designed for bulk encryption and are faster than most other symmetric functions such as DES and IDEA. RC2 is a variable length key symmetric block cipher. It can serve as a replacement for DES and is about twice as fast. RC4 is a variable length key symmetric stream cipher and it is at least 10 times as fast as DES in software. Because both RC2 and RC4 can have variable length keys, they can be as secure or insecure as is required or allowed.

(b) Asymmetric Encryption

Asymmetric encryption, also called public-key encryption, the key used for encryption is different from the key used for decryption and the decryption key cannot be calculated from the encryption key. The encryption key may be published, so that anyone could use the encryption key to encrypt the message, but only the receiver with the corresponding decryption key can decrypt the message. So the encryption key is also called the public key and the decryption key is called private key.

The RSA algorithm is perhaps the most popular public-key algorithm. It was invented by Ron Rivest, Adi Shamir and Leonard Adleman in 1977. RSA can be used for encryption/decryption, providing digital signatures and key exchange. The level of security naturally affects the needed size of the key. For short-term security it may be feasible to use shorter keys but for long-term security the key size should be at least 1024 bits and new versions support keys up to 4096 bits. When RSA is used for authentication with digital signature, the sender encrypts the message using the recipients public key and signs it with own private key. The receiver uses the sender's public key to verify the message and own private key to decrypt the message.

The Diffie-Hellman algorithm was the first ever public-key algorithm, invented in 1976 by Whitfield Diffie and Martin Hellman. The algorithm can be used for key exchange but not for encryption/decryption, thus the algorithm is typically used for exchanging the secret keys.

Diffie-Hellman may be used in different ways. In fixed Diffie-Hellman key exchange the server's certificate contains the Diffie-Hellman public parameters signed by the certificate authority (CA). That is, the public-key certificate contains the Diffie-Hellman public-key parameters. The client provides its Diffie-Hellman public key parameters either in a certificate if client authentication is required, or in a key exchange message.

One-time Diffie-Hellman is used to create ephemeral (temporary, one-time) secret keys. The Diffie-Hellman public keys are exchanged and signed using the sender's private RSA or DSS key. The receiver can use the corresponding public key to verify the signature. Certificates are used to authenticate the public keys. This would appear to be the most secure of the three Diffie-Hellman options because it results in a temporary, authenticated key.

Anonymous Diffie-Hellman uses base algorithm, with no authentication. That is, each side sends its Diffie-Hellman parameters to the other, with no authentication. This approach is vulnerable to man-in-the-middle attacks, in which the attacker conducts anonymous Diffie-Hellman with both parties.

(ii) Message-Digest Algorithms

The message digest is a compact "distillate" or "fingerprint" of your message or file checksum. A message-digest algorithm takes a variable length message as input and produces a fixed length digest as output. This fixed length output is called the message digest, a digest or a hash of the message. The digest, which is typically shorter than the original message, acts as a fingerprint of the inputted message. The message digest verifies your message and makes it possible to detect any changes made to the message by a forger. If the message were altered in any way, a different message digest would be computed from it and the change is detected. A message digest is computed using a cryptographically strong one-way hash function of the message i.e. it is easy to compute the hash of the message but it is computationally infeasible to find the original data based on the hash. If the hashes of two messages match, it is highly likely that the messages are the same.

When providing data origin authentication, a Message Authentication Code (MAC) is generated using the one-way hash function together with a secret key—these are also called keyed hashes. The MAC can be obtained by encrypting the hash with a secret key. Another method is to concatenate the message and the secret key and then calculate the hash of the combination. The receiver of the message, who possesses the same secret key as the sender, calculates the hash of the received message together with the secret key and obtains another MAC. If the two MACs match, the receiver can be sure that the message has not been modified and that it has come from someone who has possession of the secret key.

Figure 6:
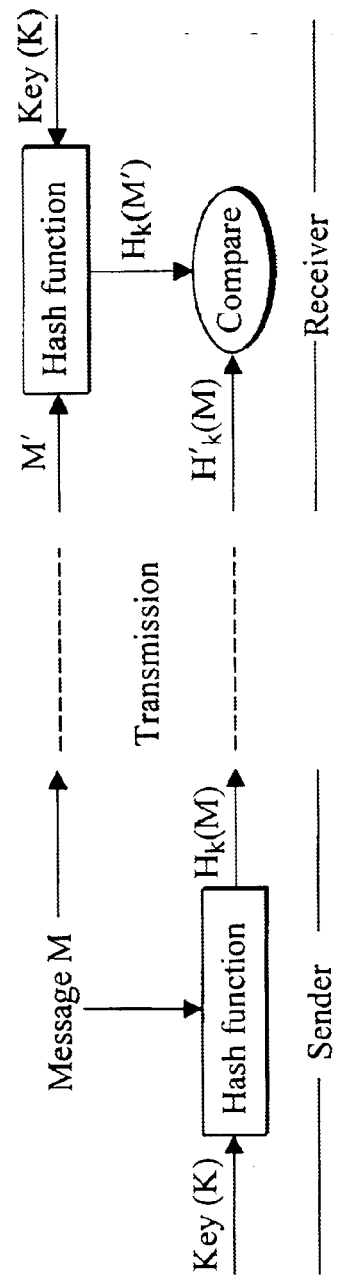
FIG. 6 shows data origin authentication with one-way hash function and a secret key, according to the prior art.
Figure 7:
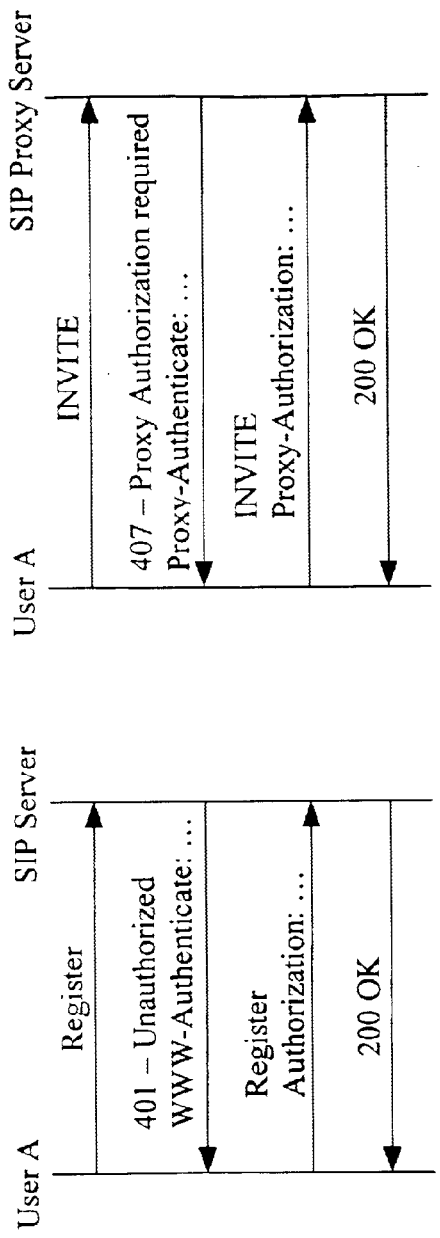
FIG. 7 shows SIP authentication, according to the prior art.
Figure 8:
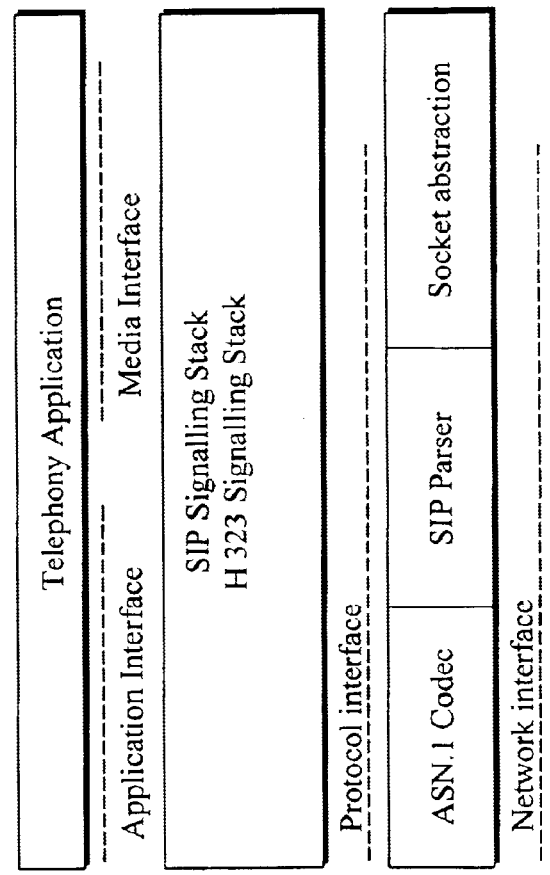
FIG. 8 shows the current architecture of the target system, according to the prior art.
Figure 9:
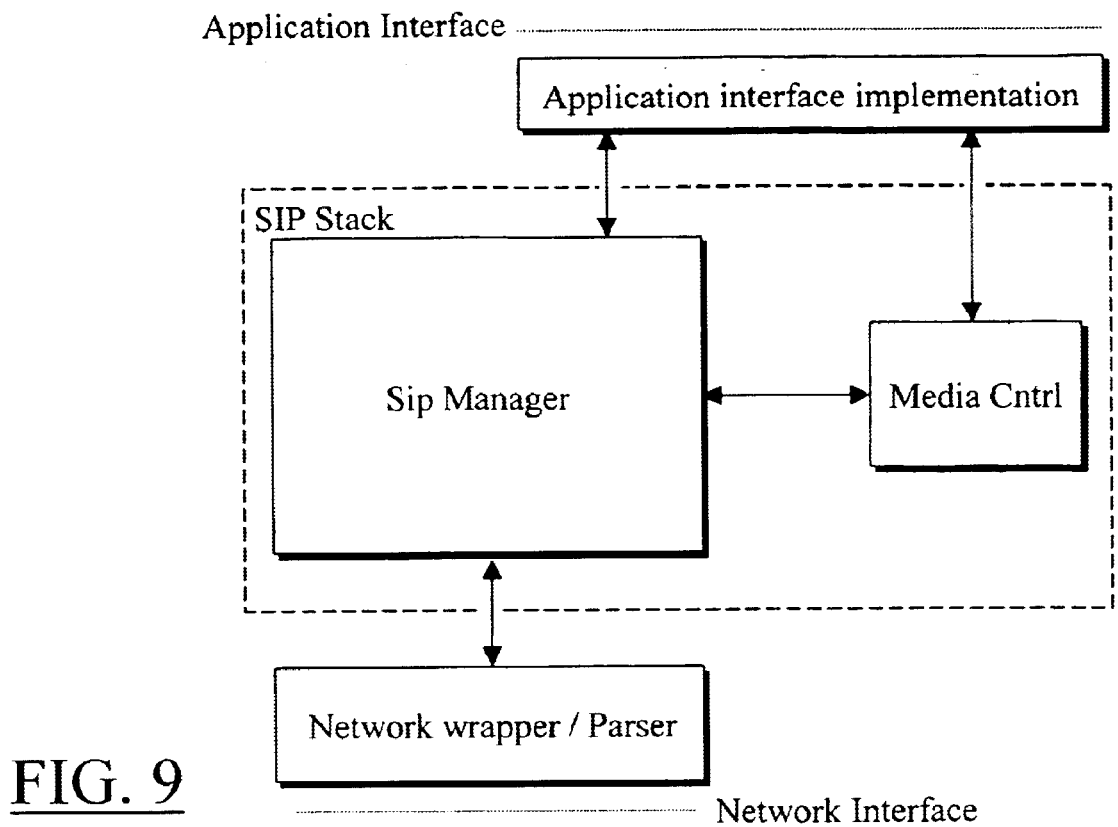
FIG. 9 shows the current architecture of the SIP protocol stack, according to the prior art.
Figure 12:
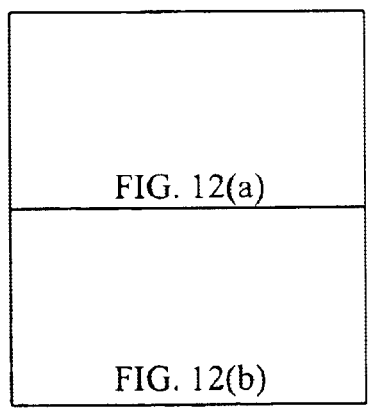
FIG. 12 shows how FIGS. 12(a) and 12(b) fit together and show MSC for call initiation, according to the present invention.
Figure 13:
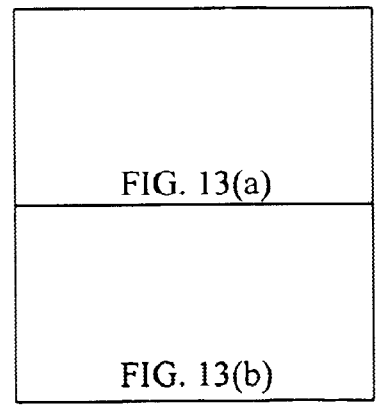
FIG. 13 shows how FIGS. 13(a) and 13(b) fit together and shows MSC for receiving a call, according to the present invention.

FIG. 6 shows a situation where two communicating parties share a secret key K that is used with a one-way hash function to provide data origin authentication. The sender generates the hash $H_K(M)$ of the message and sends it together with the message M to the other party. It might be possible that someone listening on the transmission modified the message or the hash $H_K(M)$ during the transmission. The receiver gets the message and the hash—denoted by M' and $H'_K(M)$, respectively. The receiver generates a hash $H_K(M)$ of M' using the secret key K and compares it with the hash $H'_K(M)$ received with the message. If the two hash values match, the receiver can be sure that the message has not been modified.

Message Digest 5 (MD5) is a well-known one-way hash function designed by Ron Rivest. The algorithm takes as input a message of arbitrary length and produces as output a 128-bit message digest of the input. The MD5 algorithm is intended for digital signature applications, where a large file must be "compresses" in a secure manner before being encrypted with a private key under a public-key cryptosystem such as RSA.

Another widely used one-way hash function is SHA-1 (Secure Hash Algorithm) by U.S. National Institute for Standards and Technology (NIST) with the National Security Agency (NSA). For a message of length<$2^{64}$ bits, the SHA-1 produces a 160-bit message digest. The SHA-1 is designed to be computationally infeasible to find a message which corresponds to a given message digest, or to find two different messages which produce the same message digest. The Secure Hash Algorithm (SHA-1) is required for use with the Digital Signature Algorithm (DSA) as specified in the Digital Signature Standard (DSS).

RIPEMD-160 is a 160-bit cryptographic hash function, designed by Hans Dobbertin, Antoon Bosselaers, and Bart Preneel. It is intended to be used as a secure replacement for the 128-bit hash functions MD4, MD5, and RIPEMD.

(iii) Digital Signatures

Digital signature is a method for recipient to verify the authenticity of the information's origin and also verify that the information is intact. The basic manner in which digital signatures are created is that instead of encrypting information using someone else's public key, user encrypts it with own private key. If the information can be decrypted with the corresponding public key, the originator is authenticated. Thus, public key digital signatures provide authentication, data integrity and also non-repudiation.

The Digital Signature Standard (DSS) is a cryptographic standard promulgated by the NIST in 1994. The DSS defines a public key cryptographic system for generating and verifying digital signatures. The private key is randomly generated. The public key is generated using private key and a mathematical process defined in the DSS. The DSS is used with Secure Hash Standard (SHS), to generate and verify digital signatures. First message digest is made and then the owner of the private key applies it to the message digest using the mathematical techniques specified in the DSA to produce a digital signature. Any party with access to the public key, message, and signature can verify the signature using the DSA.

(iv) PKI

Asymmetric mechanisms require that public keys are exchanged with other persons. Keys may be exchanged manually in small groups, but it is necessary to put systems into place that can provide the required security, storage, and exchange mechanisms so users could communicate with anyone if need be. This may be done by Certificate Servers, also called a cert server or a key server. Certificate server is a database that allows users to submit and retrieve digital certificates. Another system is Public Key Infrastructures (PKIs).

A PKI contains the services of a certificate server, but also provides certificate management facilities (the ability to issue, revoke, store, retrieve, and trust certificates). PKI also introduces a Certification Authority, or CA, a human entity, a person, group, department, company, or other association, that an organization has authorized to issue certificates to its computer users. A CA creates certificates and digitally signs them using the CA's private key. With CA's public key, anyone wanting to verify a certificate's authenticity verifies the issuing CA's digital signature, and hence, the integrity of the contents of the certificate, the public key and the identity of the certificate holder.

(v) Digital Certificates

Digital certificates, or certs, are forms of credentials to simplify the task of establishing whether a public key truly belongs to the purported owner. A digital certificate consists of three things, a public key, certificate information and one or more digital signatures. Certificate information helps others verify that a key is genuine or valid and the digital signature on a certificate is to state that the certificate information has been attested to by some other person or entity, Trusted Third Party (TTP). Digital certificates are used to thwart attempts to substitute one person's key for another. A digital certificate can be one of a number of different formats.

X.509 is very common certificate format. An X.509 digital certificate is a recognized electronic document used to prove identity and public key ownership over a communication network. All X.509 certificates comply with the ITU-T X.509 international standard. The X.509 standard defines what information goes into the certificate (information about a user or device and their corresponding public key), and describes how to encode it (the data format). With X.509 certificates, the validator is always a Certification Authority or someone designated by a CA.

(vi) Security Protocols and Applications (a) Transport Layer Security

The Transport Layer Security TLS) protocol provides communication privacy and data integrity between two communicating applications. TLS is in practice the same as Secure Sockets Layer protocol version 3 (SSLv3). The protocol is composed of two layers: the TLS Record Protocol and the TLS Handshake Protocol.

The TLS Record Protocol forms the lower level. It is layered on top of some reliable transport protocol, e.g. TCP, and provides secure connection with confidentiality and integrity. The TLS Record Protocol takes messages to be transmitted, fragments the data into manageable blocks, optionally compresses the data, applies a MAC, encrypts, and transmits the result. Received data is decrypted, verified, decompressed, and reassembled, then delivered to higher level clients.

The cryptographic parameters of the session state are produced by the TLS Handshake Protocol, which operates on top of the TLS Record Layer. The TLS Handshake Protocol allows the server and client to authenticate each other and to negotiate an encryption algorithm, cryptographic keys and other security parameters used by the Record Protocol. This all is done before the application protocol transmits or receives its first byte of data.

TLS supports three authentication modes: authentication of both parties, server authentication with an unauthenticated client, and total anonymity. If the server is authenticated, its certificate message must provide a valid certificate chain leading to an acceptable certificate authority. Similarly, authenticated clients must supply an acceptable certificate to the server. Each party is responsible for verifying that the other's certificate is valid and has not expired or been revoked.

(b) IPSEC—Internet Protocol Security

Requirements for security in the Internet lead the IETF IP Security Working Group to work on a set of standard mechanisms that would enable secure communications between end hosts. The IP Security (IPSEC) or Security Architecture for the Internet Protocol provides a standard security mechanism and services to the currently used IP version 4 (IPv4) and to the new IP version 6 (IPv6). It does this by specifying two standard headers to be used with both versions of IP datagrams: IP Authentication Header (AH) and IP Encapsulating Security Payload (ESP). IPSEC focuses on the security that can be provided by the IP-layer of the network and does not care about the application level security.

The IP Authentication Header was designed to provide at least strong integrity and authentication to IP datagrams. It does this by computing a cryptographic authentication function over the IP datagram and using a secret authentication key in the computation. It may also provide non-repudiation, but that depends on implemented algorithms and how keying is performed. The intended lack on confidentiality (encryption) is though to ensure its wide use on the Internet even on locations where the export, import or use of encryption is regulated. Currently implemented algorithms and modes are Keyed MD5 and Keyed SHA. Only the former is needed for conformance to the standard and the latter is still considered experimental.

The IP Encapsulating Security Payload was designed to provide at least integrity and confidentiality to IP datagrams. It does this by encrypting data to be protected and placing the encrypted data in the data portion of the IP Encapsulating Security Payload. It may also provide authentication, but that depends on implemented algorithms and their modes of use. It should be noted that non-repudiabon and protection from traffic analysis are not provided by ESP. Currently implemented algorithms and modes are standard DES used in CBC-mode and triple DES in CBC-mode. Only the former is needed for conformance to the standard and the latter is still considered experimental.[20]

The concept of Security Association is fundamental to both ESP and AH. It is a combination of an unstructured opaque index called Security Parameters Index (SPI) and a destination address. This combination uniquely identifies all parameters needed for secure communication between any two parties conforming to IPSEC (e.g. algorithm, mode, keys, transform, lifetimes, etc.). The Internet Security Association and Key Management Protocol (ISAKMP) is intended to support the negotiation of SAs for security protocols at all layers of the network stack. ISAKMP defines procedures and packet formats to establish, negotiate, modify and delete security associations. However, it does not define the actual protocols to be used (such as key exchange protocols and hash functions), these are implementation specific. In IPSEC the Internet Key Exchange (IKE) can be used as a protocol that defines the needed protocols and functions for ISAKMP.

(c) Pretty Good Privacy (PGP)

PGP (Pretty Good Privacy) is a public key encryption program originally written by Phil Zimmerman in 1992. PGP was further developed by an international group and was finally worked on and released by the Massachusetts Institute of Technology.

PGP is a hybrid cryptosystem that combines some of the best features of both secret key and public key mechanisms. Secret key algorithms are used to encrypt the message and public key algorithms are used to encrypt session key and to authenticate the message. The private key is protected by an arbitrary long pass phrase. Encrypted messages can not be deciphered without the private key pass phrase. Keys used in PGP may be from 512 up to 4096 bits, preferably at least 1024 bits.

PGP offers a selection of encryption methods to perform two functions:

Encryption and decryption
Authentication of encrypted information

PGP uses secret key algorithms to encrypt the actual message. A secret key algorithm means here a conventional or symmetric block cipher that uses the same key for both encryption and decryption. The three symmetric block ciphers offered by PGP are CAST, Triple-DES, and IDEA. For encryption, PGP first creates a random session key for the message. Using the selected algorithm with the session key, the message is then encrypted.

The session key is then encrypted with the RSA or Diffie-Hellman/DSS public key of the recipient. The encrypted message and session key are bundled together and then message ready to be sent or stored. When the recipient gets the key and the message, private key is used to decrypt the session key, and then the session key is used to decrypt the message.

PGP has also the ability to verify the origin of encrypted file by using a digital signature. Digital signature allows message to be authenticated and verified if it was modified. A user creates a signature on a file by using a private key and passphrase. Then anyone with the corresponding public key is able to verify that the message came from that user. The signature process also checks if the file has been modified at all.

III. VOIP Security

VoIP security is one of the major technical issues that has to be defined before VoIP can be used in public networks like the internet. Internet telephony users do not want their calls to be listened to or their sensitive information, like phone numbers, passwords or credit card numbers, to be revealed to an unintented party. Thus not only the audio stream needs protection, but the control signalling requires security as well.

SIP has a wide variety of security features providing encryption integrity and authentication. In addition to SIP's own security services it may also use others, like PGP, IPSEC or TLS.

A. SIP Security

SIP requests and responses may contain sensitive information about the communication patterns and communication content of individuals. The SIP message body may also contain encryption keys for the session itself and thus security mechanisms are needed. SIP includes a wide variety of security features mainly for providing encryption and authentication for end-to-end or hop-by-hop communication. In addition to SIP's own security services, other services, like PGP, IPSEC or TLS, may be used.

(i) Confidentiality

Encryption can take place either end-to-end between user agents, or hop-by-hop between any two SIP entities.

End-to-End encryption occurs between the two user agents involved in the communication. The SIP message body and certain sensitive header fields are encrypted with a shared key or a public key of the other user agent. All implementations should support PGP-based encryption.

Hop-by-hop encryption makes possible to encrypt the entire SIP message, including the headers that are not encrypted end-to-end. The Hop-by-hop encryption is supposed to work on the transport or the network layer. No particular mechanism is defined or recommended, but IPsec or TLS is suggested.

When using end-to-end encryption between user agents some basic rules are necessary to follow. They are:

1. All header fields must not be encrypted since they are needed to be understood by the intermediate SIP entities.
2. All header fields that are not encrypted must precede those that are encrypted, see the first example below.
3. It is not necessary to encrypt any SIP headers, see the second example below.
4. An encryption header must be inserted to indicate the encryption mechanism used.
5. The responses to the encrypted requests should be encrypted with a key given in the Respons-key header field in the request. If none is given, the answer should be sent unencrypted.
6. The headers that were encrypted in the request should also be encrypted in the response.

In the examples below, taken from RFC 2543, $ indicates CRLF and the area marked with * indicates the encrypted part of the message.

```
INVITE sip:watson@boston.bell-telephone.com SIP/2.0$
Via: SIP/2.0/UDP 169.130.12.5$
To: T. A. Watson <sip:watson@bell-telephone.com>$
From: A. Bell <sip:a.g.bell@bell-telephone.com>$
Encryption: PGP version=5.0$
Content-Length: 224$
Call-ID: 187602141351@worcester.bell-telephone.com$
Content-Type: message/sip$
CSeq: 488$
$
*****************************************************************
* Subject: Mr. Watson, come here.$                               *
* Content-Type: application/sdp$                                 *
* $                                                              *
* v=0$                                                           *
* o=bell 53655765 2353687637 IN IP4 128.3.4.5$                   *
* s=Mr. Watson, come here.$                                      *
* t=0 0$                                                         *
* c=IN IP4 135.180.144.94$                                       *
* m=audio 3456 RTP/AVP 0 3 4 5$                                  *
*****************************************************************
INVITE sip:watson@boston.bell-telephone.com SIP/2.0$
Via: SIP/2.0/UDP 169.130.12.5$
To: T. A. Watson <sip:watson@bell-telephone.com>$
From: A. Bell < a.g.bell@bell-telephone.com$
Encryption: PGP version=5.0$
Content-Type: application/sdp$
Content-Length: 107$
Call-ID: 18702141351@worcester.bell-telephone.com$
CSeq: 488$
$
*****************************************************************
* $                                                              *
* v=0$                                                           *
* o=bell 53655765 2353687637 IN IP4 128.3.4.5$                   *
* c=IN IP4 135.180.144.94$                                       *
* m=audio 3456 RTP/AVP 0 3 4 5$                                  *
*****************************************************************
```

Not all of the SIP request or response headers can be encrypted end-to-end because header fields such as To, Via, Encryption and Authorization need to be visible to proxies so that the SIP message can be routed correcty. For a full listing of the header fields to be encrypted, see below.

The "where" column describes the request and response types with which the header field can be used. "R" refers to header fields that can be used in requests (that is, request and general header fields). "r" designates a response or general-header field as applicable to all responses.

The "enc." column describes whether this message header field MAY be encrypted end-to-end. A "n" designates fields that MUST NOT be encrypted, while "c" designates fields that SHOULD be encrypted if encryption is used.

The "e—e" column has a value of "e" for end-to-end and a value of "h" for hop-by-hop header fields.

Other header fields may be encrypted or may travel in the clear as desired by the sender. The Subject, Allow and Content-Type header fields will typically be encrypted. The Accept, Accept-Language, Date, Expires, Priority, Require, Call-ID, Cseq, and Timestamp header fields will remain in the clear.

|  | where | enc. | e–e |
|---|---|---|---|
| Accept | R/r |  | e |
| Accept | 415 |  | e |
| Accept-Encoding | R/r |  | e |
| Accept-Encoding | 415 |  | e |
| Accept-Language | R |  | e |

-continued

|  | where | enc. | e–e |
|---|---|---|---|
| Accept-Language | 415 |  | e |
| Alert-Info | R | e | e |
| Allow | 200 |  | e |
| Allow | 405 |  | e |
| Authorization | R/r |  | e |
| Call-ID | gc | n | e |
| Contact | R | e | o |
| Contact | 1xx |  | e |
| Contact | 2xx |  | e |
| Contact | 3xx |  | e |
| Contact | 485 |  | e |
| Content-Disposition |  | e | e |
| Content-Encoding |  | e | e |
| Content-Length |  | n | e |
| Content-Type |  | e | e |
| Cseq | gc | n | e |
| Date | g |  | e |
| Encryption | g | n | e |
| Expires | g | e |  |
| From | gc | n | e |
| Hide | R | n | h |
| Max-Forwards | R | n | e |
| MIME-Version | g | n | e |
| Organization | g | e | h |
| Priority | R | c | e |
| Proxy-Authenticate | 401,407 | n | h |
| Proxy-Authorization | R | n | h |
| Proxy-Require | R | n | h |
| Record-Route | R |  | h |
| Record-Route | 2XX, 401, 484 |  | h |
| Require | g |  | e |
| Response-Key | R | c | e |

-continued

|  | where | enc. | e-e |
|---|---|---|---|
| Retry-After | R | c | e |
| Retry-After | 404, 480, 486 | c | e |
|  | 503 | c | e |
|  | 600, 603 | c | e |
| Route | R |  | h |
| Server | r | c | e |
| Subject | R | c | e |
| Support | g | c | e |
| Timestamp | g |  | e |
| To | gc(1) | n | e |
| Unsupported | 420 | e | o |
| Unsupported | R |  | e |
| User-Agent | g | c | e |
| Via | gc(2) | n | e |
| Warning | r |  | e |
| WWW-Authenticate | R/401 | c | e |

Hop-by-hop encryption encrypts the entire SIP message including those headers that can not be encrypted end-to-end. Hop-by-hop encryption can also encrypt requests and responses that have been end-to-end encrypted. Hop-by-hop encryption is supposed to work on the transport or the network layer. No particular mechanism is defined or recommended, but IPsec or TLS is suggested.

(ii) Integrity and Authentication

SIP extends the HTTP WWW-Authenticate and Authorization header fields and their Proxy counterparts to include cryptographically strong signatures for providing integrity and authentication. SIP also supports the HTTP "basic" and "digest" schemes and other HTTP authentication schemes to be defined that offer a rudimentary mechanism of authentication without integrity. The transport-layer or the network-layer authentication may be used for hop-by-hop authentication (e.g. IPSEC Authentication header).

When using authentication the user digitally signs the message that is about to be sent. The signature extends over the SIP message, so that the status-line, the Sip version number, the headers after the Authorization header and the message body are included in the signature. Header fields that are not Included are those that changes between hops, such as the Via header. The example below illustrates the signed part of the message.

```
INVITE sip: watson@boston.bell-telephone.com SIP/2.0
Via: SIP/2.0/UDP 169.130.12.5
Authorization: PGP version=5.0, signature=...
From: A. Bell <sip:a.g.bell@bell-telephone.com>
To: T. A. Watson <sip:watson@bell-telephone.com>
Call-ID: 187602141351@worcester.bell-telephone.com
Subject: Mr. Watson, come here.
Content-Type: application/sdp
Content-Length: ...
v=0
o=bell 53655765 2353687637 IN IP4 128.3.4.5
s=Mr. Watson, come here.
t=0 0
c=IN IP4 135.180.144.94
m=audio 3456 RTP/AVP 0 3 4 5
```

A data block that is signed is shown below.

```
INVITESIP/2.0From: A. Bell <sip:a.g.bell@bell-telephone.com>
To: T. A. Watson <sip:watson@bell-telephone.com>
Call-ID: 187602141351@worcester.bell-telephone.com
Subject: Mr. Watson, come here.
Content-Type: application/sdp
Content-Length: ...
v=0
o=bell 53655765 2353687637 IN IP4 128.3.4.5
s=Mr. Watson, come here.
t=0 0
c=IN IP4 135.180.144.94
m=audio 3456 RTP/AVP 0 3 4 5
```

Messages that are not authenticated may be challenged by any SIP entity downstream from the user. The challenge could either be included in a 401 Unauthorized or a 407 Proxy authorization required response message. If a two way authentication in desired, the required header with the signed-response parameter should be used.

(iii) SIP Security Using PGP

SIP security implementations using PGP must support the definitions and the algorithms of openPGP (RFC 2440) and may implement the older version, based upon PGP 2.6 (RFC 1991).

(a) Authentication

If authentication is desired the server responds to the non-authorized request with the WWW-Authenticate Response Header with realm, nonce and the desired PGP parameters.

The syntax and example of WWW-Authenticate header is described below.

```
WWW-Authenticate = "WWW-Authenticate" ":" "pgp" pgp-challenge
pgp-challenge =    # pgp-params
pgp-params =       realm | pgp-version | pgp-micalgorithm
                   | pgp-pubalgorithm | nonce
realm =            "realm" "=" realm-value
realm-value =      quoted-string
pgp-version =      "version" "="
                   <"> digit *("." digit) *letter <">
pgp-micalgorithm = "algorithm" "=" ("md5" | "sha1" | token
                                   | "ripemd160" | "MD2" | "TIGER192" |
                                   "HAVAL-5-160")
pgp-pubalgorithm = "pubkey" "=" ("rsa" | "rsa-encrypt"
                                | "rsa-sign" | "elgamal" | "dsa" | token)
nonce =            "nonce" "=" nonce-value
nonce-value =      quoted-string
```

EXAMPLE

```
WWW-Authenticate: pgp version="5.0"
realm="Your Startrek identity, please", algorithm=md5,
nonce="913082051"
```

The client is expected to retry the request including an Authorization header line. The client authenticates itself by using its own private key for signing the request message. The signature is done over the part described in previous chapter and added in Authorization header. The server can ascertain the origin of the request if it has access to the corresponding public key.

The syntax and example of Authorization header is described below.

---

Authorization = "Authorization" ":" "pgp" # pgp-response
pgp-response = realm | pgp-version | pgp-signature
 | signed-by | nonce
pgp-signature = "signature" "=" quoted-string
signed-by = "signed-by" "=" <"> URI <">

---

EXAMPLE

---

Authorization: pgp version="5.0"
realm="Your Startrek identity, please",
nonce="913082051"
signature="iQB1AwUBNNJiUaYBnHmiiQh1AQFYsgL/Wt3dk6TWK81/b
0gcNDf
VAUGU4rhEBW972IPxFSOZ94L1qhCLInTPaqhHFw1cb3IB01rA0Rhp
V4t5yCdUtSRYBSkOK29o5e1KIFeW23EzYPVUm2TIDAhbcjbMdfC+KLFX=alrx"

---

(b) PGP Encryption Scheme

If encryption is desired, an Encryption header has to be added. The part of message to be encrypted is implementation dependent. Possible headers to be encrypted have been listed previously above in Section III.A.(i). PGP encryption sheme uses the following syntax:

--- encryption = "Encryption" ":" "pgp" pgp-eparams
pgp-eparams = 1# ( pgp-version | pgp-encoding )
pgp-encoding = "encoding" "=" "ascii" | token

---

EXAMPLE

Encryption: pgp version="5.0", encoding="ascii"

(c) Response-Key Header field for PGP

If the response is wanted to be encrypted, the response-key header must be used for the user's public key.

---

Response-Key = "Response-Key" ":" "pgp" pgp-eparams
pgp-eparams = 1# (pgp-version | pgp-encoding | pgp-key)
pgp-key = "key" "=" quoted-string

---

EXAMPLE

---

Response-Key: pgp version="5.0", encoding="ascii",
key=
"mQBtAzNWHNYAAAEDAL7QvAdK2utY05wuUG+ItYK5tCF8HNJ
M60sU4rLaV+eUnkMkmOmJWtc2wXcZx1XaXb2lkydTQOesrUR75IwN
XBuZXPEIMThEa5WLsT7VLme7njnxsE86SgWmAZx5ookldQAFEbQx
SGVubmluZyBTY2h1bHpyaW5uZSA8c2NodWx6cmlubmVAY3MuY29
sdW1iaWEuZWR1Pg= = =+y19"

---

III. VOIP Terminal Security Implementation

A. Objectives

The main objectives for the VoIP terminal security implementation are to provide security for the VoIP terminal protocol.

A secure VoIP terminal requires reliable user authentication, integrity and confidentiality of protocol signalling. The VoIP terminal according to the present invention includes a protocol stack containing security management and network signalling interfaces for handling message exchanges.

The chosen security mechanisms are Implemented in an existing non-secure SIP terminal. The security solution implemented to the protocol stack consists of security signalling in and out of the terminal, message handling, new states required for the security features and the interfaces of the security module. The architecture and signalling of the secure VoIP terminal is described. In the implementation, focus is kept in three different areas, security modifications in the protocol stack, security module interfaces, and in the security module implementation. The objective is to make an independent security module for use in conjunction with the protocol stack. The implemented security module is easy to attach to the stack and also external security services (e.g. PGP) are easy to use by the security module.

B. VoIP Security Requirements on Terminal Implementation (i) SIP Security Requirements SIP includes a wide variety of security features mainly for providing encryption and authentication. Both encryption and authentication may be done either end-to-end or hop-by-hop. SIP supports many different mechanisms for implementing these services as described in section III above. The objectives for terminal security solutions require the implementation of protocol signalling, while hop-by-hop security is done by IPSEC or TLS and thus not required in solution.

It is necessary that the signalling stack manages and recognizes all the headers, methods and response codes described in the requirements. Furthermore, the parser manages the syntax according to the encrypted messages. Required security capabilities are:

- Handle "WWW-Authenticate" header received in 401 Unauthorized Response for indicating the scheme used for authentication.
- Use of "Authorization" header when registering or required after receiving a 401 Unauthorized response.
- Use "Encryption" header to indicate the scheme used to encrypt the actual message.
- Handle "Proxy-Authenticate" header received in 407 Proxy Authentication Required for indicating the scheme used.
- Use of "Proxy-Authorization" to identify the UA when accessing the Proxy, it contains the user credentials.
- Handle "Response-Key" header to request the public key from called user to be able to recover the encrypted responses.

For encryption and authentication the solution provides a generic interface for external security applications (like PGP). A SIP request (or response) is end-to-end encrypted by splitting the message to be sent into a part to be encrypted and a short header that will remain in the clear. The implemented interface provides information of the message portion to be encrypted and signed. The header fiews to be encrypted or to be left clear were listed above in Section III.A.(i).

The solution is designed to retain the current modularity of the stack remains and the new security features have their own module which is as generic as possible.

IV. SIP Security Solution

The requirements for the SIP security solution are presented in Section IV.B.(I) above. The solution is divided in three areas.
1. Design and implementation of needed modifications to the existing protocol stack.
2. Design and implementation of the interfaces between the new security module and other entities.
3. Design and implementation of the security module, which provides the needed security functionalities.

A. The Current Architecture of the Target Systems

The structure of the target VoIP terminal is shown in FIG. 15.

The telephony application (user terminal) controls all the other components in the architecture through the application interface. The main functionality is located in the signalling stack, which handles the call control and signalling. Media streams are handled through the media interface. Signalling stack operates through the protocol interface to make the desired coding and message parsing. The socket abstraction utilizes the network interface to provide the network connection.

The structure of the SIP signalling stack is described in figure below. The SIP stack has two entities, SIP Manager and Media Controller. The SIP manager consists of logical entities for handling messages, terminal parameters and SIP call control. Media controller operates with the SIP manager, application and network through appropriate interfaces.

The core of the SIP signalling stack consists of the state machine, which controls all signalling and state changes in the stack. Each logical entity in the SIP stack is an independent process, which has own states and signalling behavior.

B. SIP Secure Architecture

Figure 10:
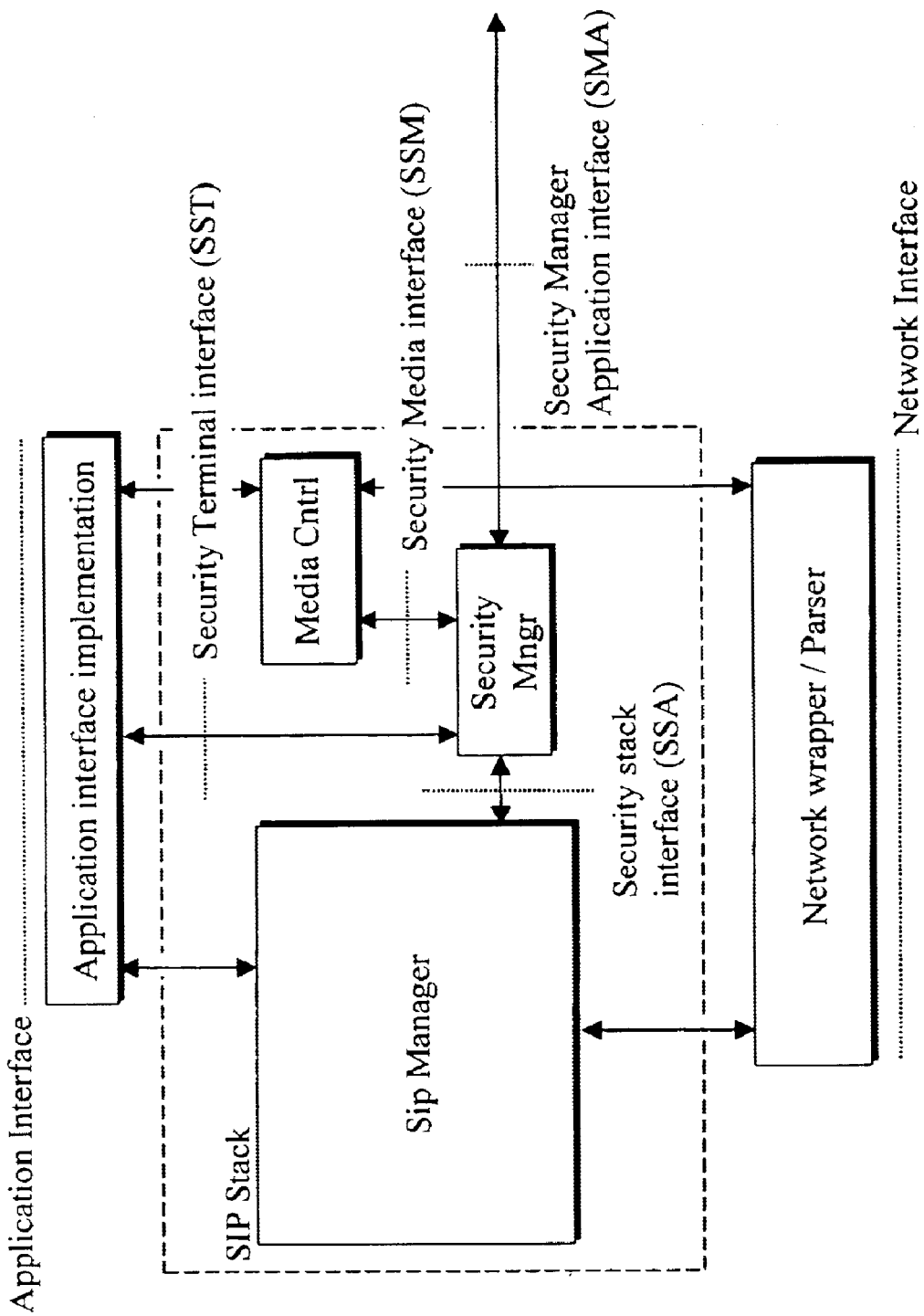
FIG. 10 shows secure SIP protocol stack architecture, according to the present invention.

The secure SIP protocol architecture is described in FIG. 10.

New entity called Security Manager is presented in the secure architecture. Main tasks for the Security Manager are:
  Handle security message signalling and state changes in the security manager
  Get the security parameters from the user application
  Authentication and authorization of the messages
  Encryption and decryption of the messages
  Encryption and decryption of the media stream

C. Implementation (i) Modifications to the Current Stack

The security manager process is created by the SIP manager in cases when a valid call is incoming or the user is initiating a new call and security is required by user. A new process is created with the state machine process_create function.

After the security manager process is created, the security parameters of the terminal should be set. Needed modifications for terminal parameter (passphrase etc.) settings are done to the SIP manager.

The existing stack does not provide any parsing or handling for security messages, so parsing, encoding, decoding and identification for all required messages has been added to the stack. For a SIP message encoding, the message structure content and filling is modified. Decoding of incoming SIP message required own extraction functions for all the required message headers. Identification required new cases to match the security messages in the message receive function.

Figure 11:
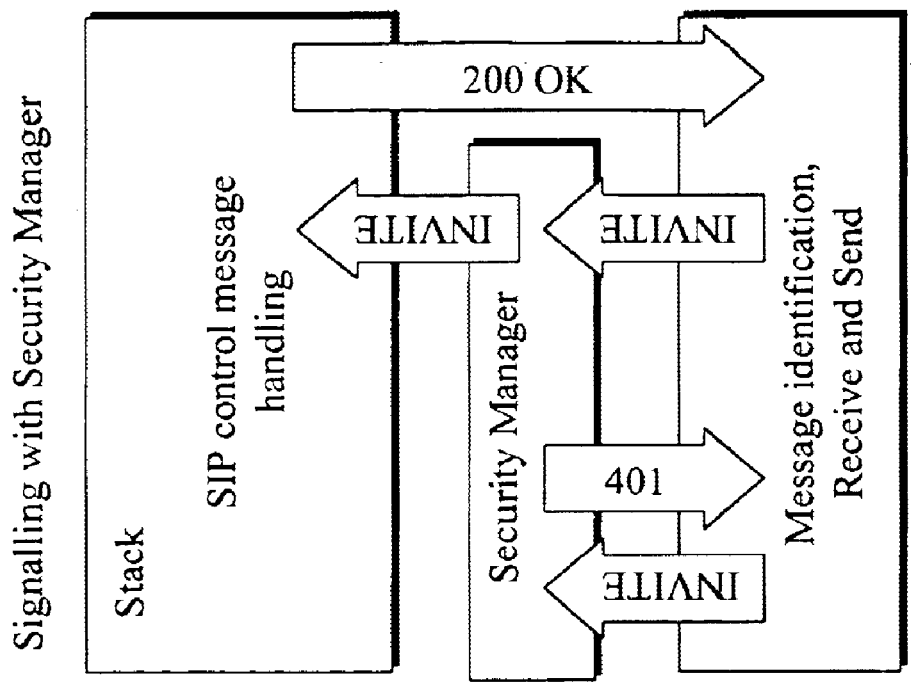
FIG. 11 shows a signaling change in the protocol stack, according to the present invention.
Figure 11:
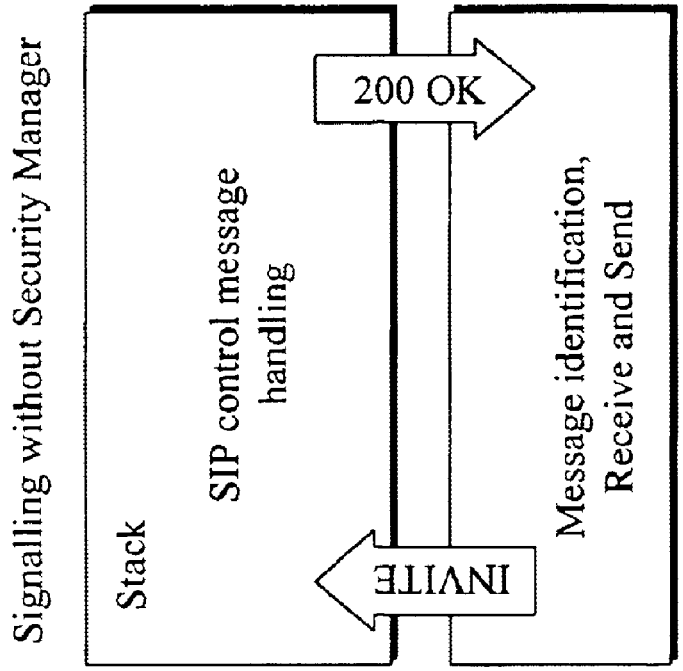

Signalling changes in the stack are kept as minimum as possible. Only the lowest level of the stack, where the message is received, identified and sent, is modified to handle all the security messages. Invite messages and authentication related response messages are always sent to security manager. In practice, this means that the authentication is done at this level and only valid calls are forwarded to the stack as illustrated in FIG. 11.

All received messages are authenticated and decrypted by the interface functions added in the receive function. All message s are encrypted and authorized with the proper interface functions before sending.

(ii) SIP Security Stack Interface

As shown in FIG. 10, the interface between the SIP stack and the security manager is called the SIP Security Application Interface (SSA interface). The SSA interface provides means to perform all the security tasks required. The SIP_Message parameter contains structured data of the message header fields. The second parameter frame is a pointer to a character string containing the whole SIP Message.

SSA interface functions:

```
Int ssa_encrypt(SIP_Message *message, char *frame);
Int ssa_decrypt(SIP_Message *message, char *frame);
Int ssa_authenticate(SIP_Message *message, char *frame);
Int ssa_authorize(SIP_Message *message, char *frame);
```

(iii) SIP Security Application Interface

As also shown in FIG. 10, an SIP Security Manager Application Interface (SMA) provides means for usage of the external security services, such as PGP. The second parameter is used to pass the key or the key ID and the third is used for passphrase.

Interface functions:

```
Int sma_encrypt(SIP_Message *Message, char *key, char *pass);
Int sma_decrypt(SIP_Message *Message, char *key, char *pass);
Int sma_sign(char *signature, SIP_Message *Message, char *key, char *pass);
Int sma_verify_sign(char *signature, SIP_Message *Message, char *key, char *pass);
```

(iv) SIP Security Media Interface

An SIP Security Media Interface (SSM) is shown in FIG. 10. It provides the means for en/decryption of the media stream. The parameter RTP_Packet points to the struct containing the RTP data. Frame parameter points to the encrypted media.

Interface functions:

```
Int ssm_encrypt(RTP_Packet *Packet, char *frame, char *key);
Int ssm_decrypt(RTP_Packet *Packet, char *frame, char *key);
```

(v) SIP Security Terminal Interface

FIG. 10 also shows an SIP Security Terminal Interface (SST) that provides means for getting all the information from the terminal application needed to secure the connection. Sec_Capability is a structure containing the terminal security capabilities.

Interface functions:

Int sst_getSecurityCapability(Sec_Capability *Capability);

(vi) Security Manager

The Security Manager module consists of the Security Manager state machine process and the implementation of the Security Manager interface functions.

Figure 14A:
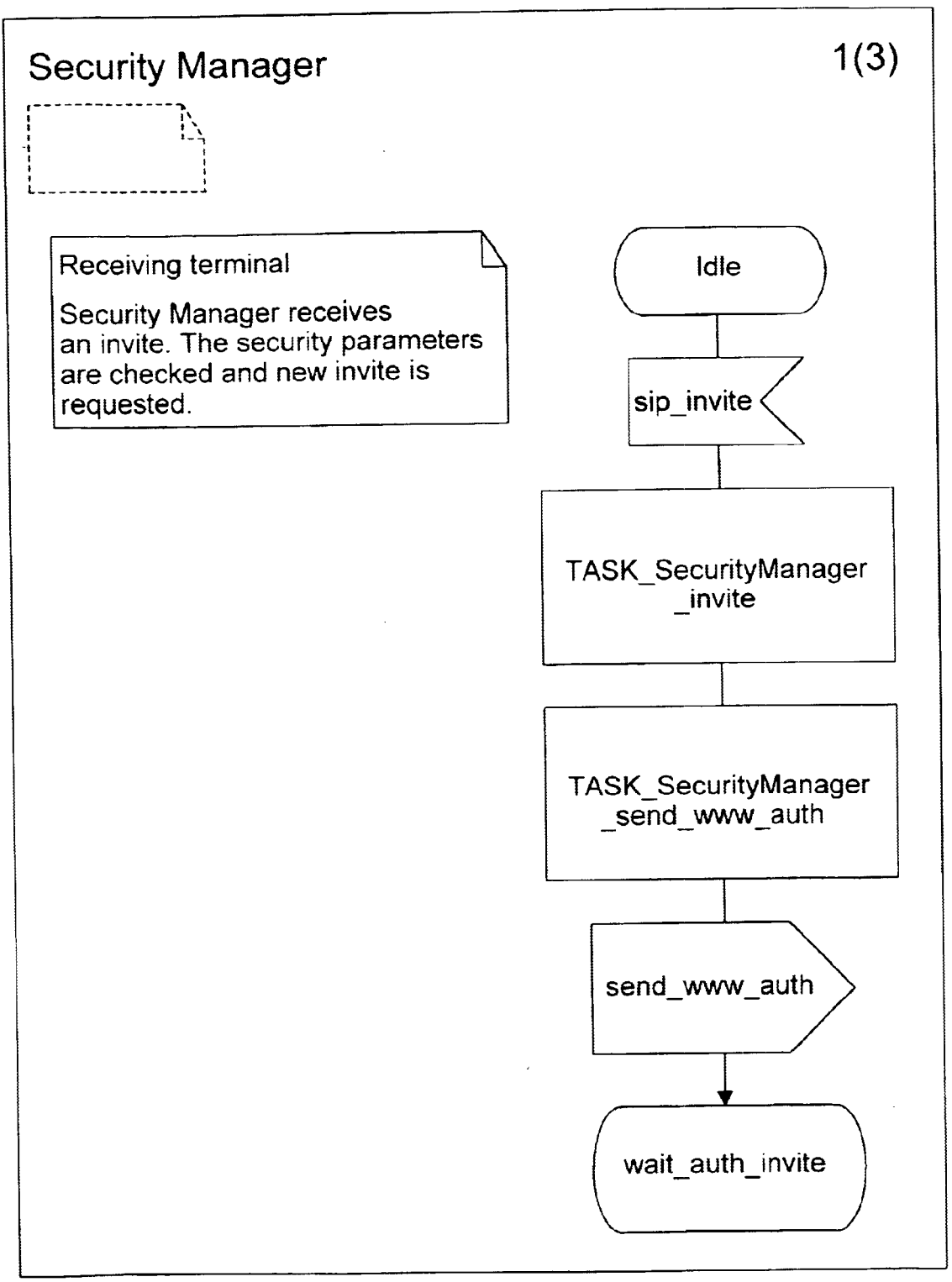
FIGS. 14(a), 14(b) and 14(c) altogether show a state diagram for the security manager, according to the present invention.
Figure 14B:
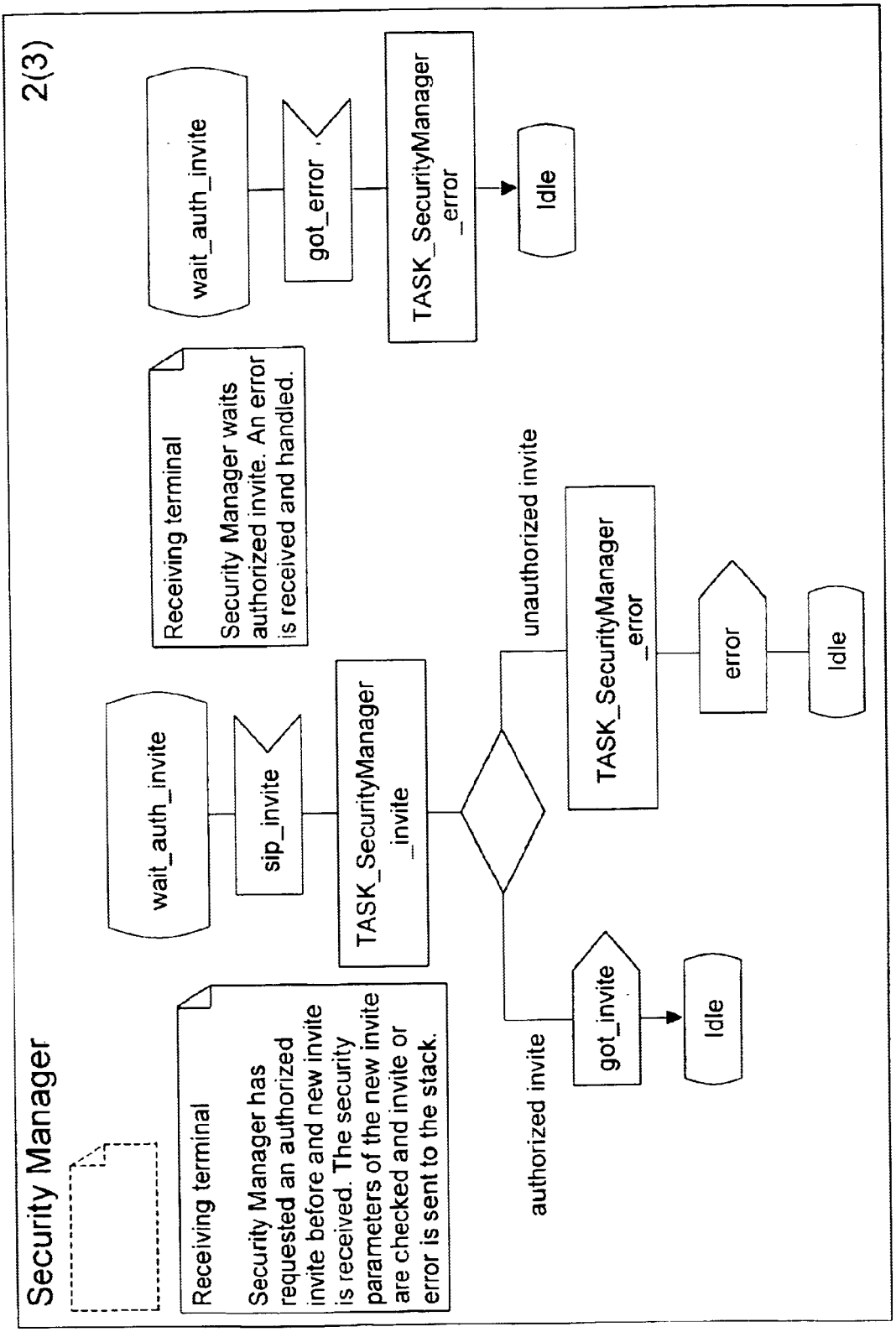
Figure 14C:
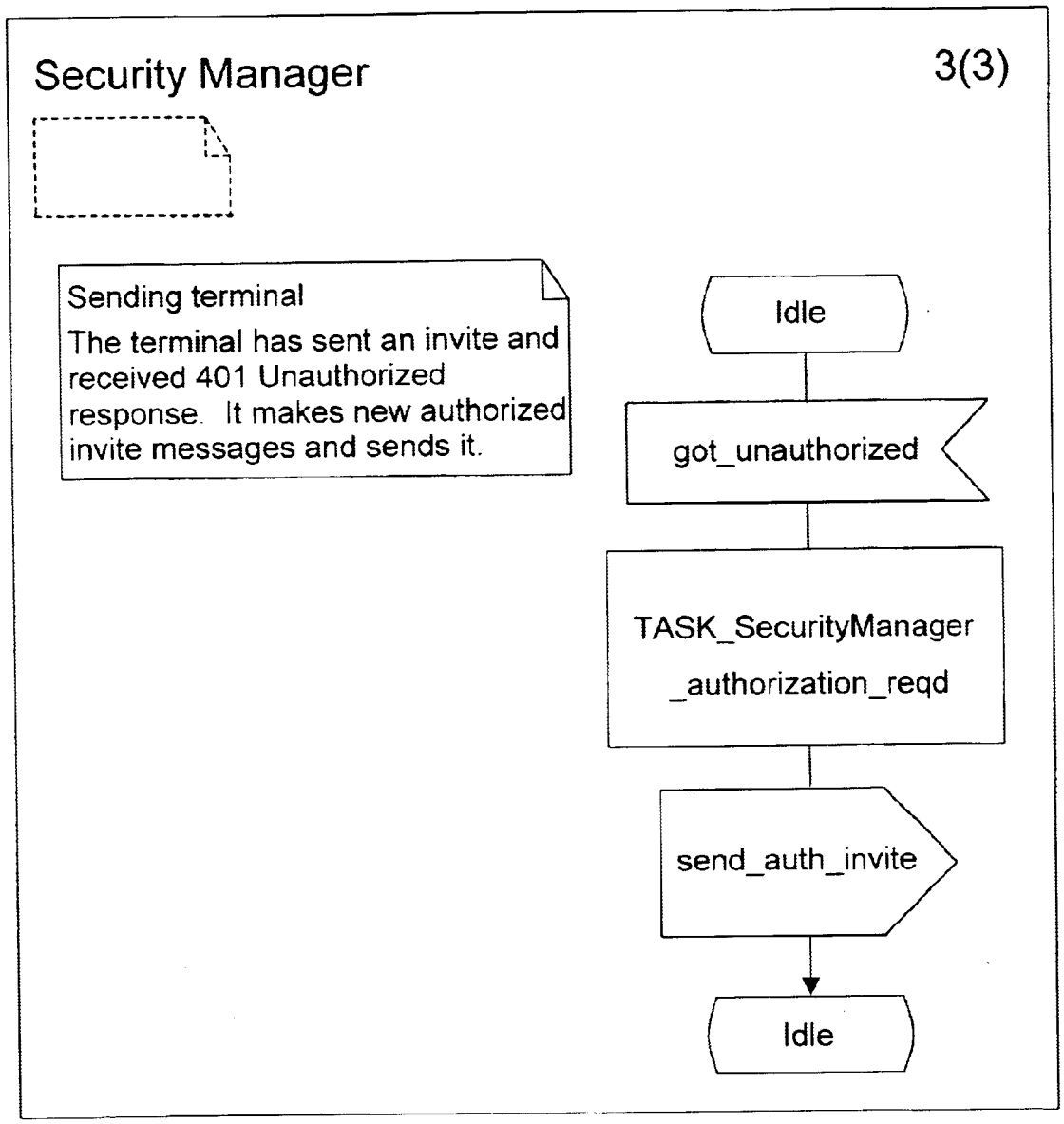

As shown in FIGS. 14(a), 14(b) and 14(c), the Security Manager state machine has only two states: Idle and wait_authorized_invite. Normally the process is at an idle state. Only when an unauthorized invite has been received and authentication is required is the state changed to wait_authorized_invite. When the security manager is at this state, all received error responses are sent to the security manager (got_error signal). The signals of the security manager are presented in Table 4 below.

| State before | Signal from stack | Task |
|---|---|---|
| Sending terminal | | |
| Idle | got_unauthorized | TASK_SecurityManager _authorization_reqd |
| State after | Signal to stack | Purpose |
| Idle | Send_auth_ invite | Make authorized message |
| State before | Signal from stack | Task |
| Receiving terminal | | |
| Idle | sip_invite | TASK_SecurityManager _invite TASK_SecurityManager _send_www_auth |
| wait_authorized_invite | sip_invite | TASK_SecurityManager _invite |
| wait_authorized_invite | sip_invite | TASK_SecurityManager _invite TASK_SecurityManager _error |
| wait_authorized_invite | got_error | TASK_SecurityManager _error |
| State after | Signal to stack | Purpose |
| wait_auth_invite | send_www_auth | Check the incoming invite in Idle state and move to wait_auth_invite state, send send_www_auth to the stack |
| Idle | got_invite | Check the incoming invite in wait_auth_invite state and move to idle state (call was authorized) send got_invite to the stack |
| Idle | error | Check the incoming invite in wait_auth_invite state and move to idle state (call was not authorized) send error |
| Idle | | Handle the error |

(vii) Call Establishment

Figure 12A:
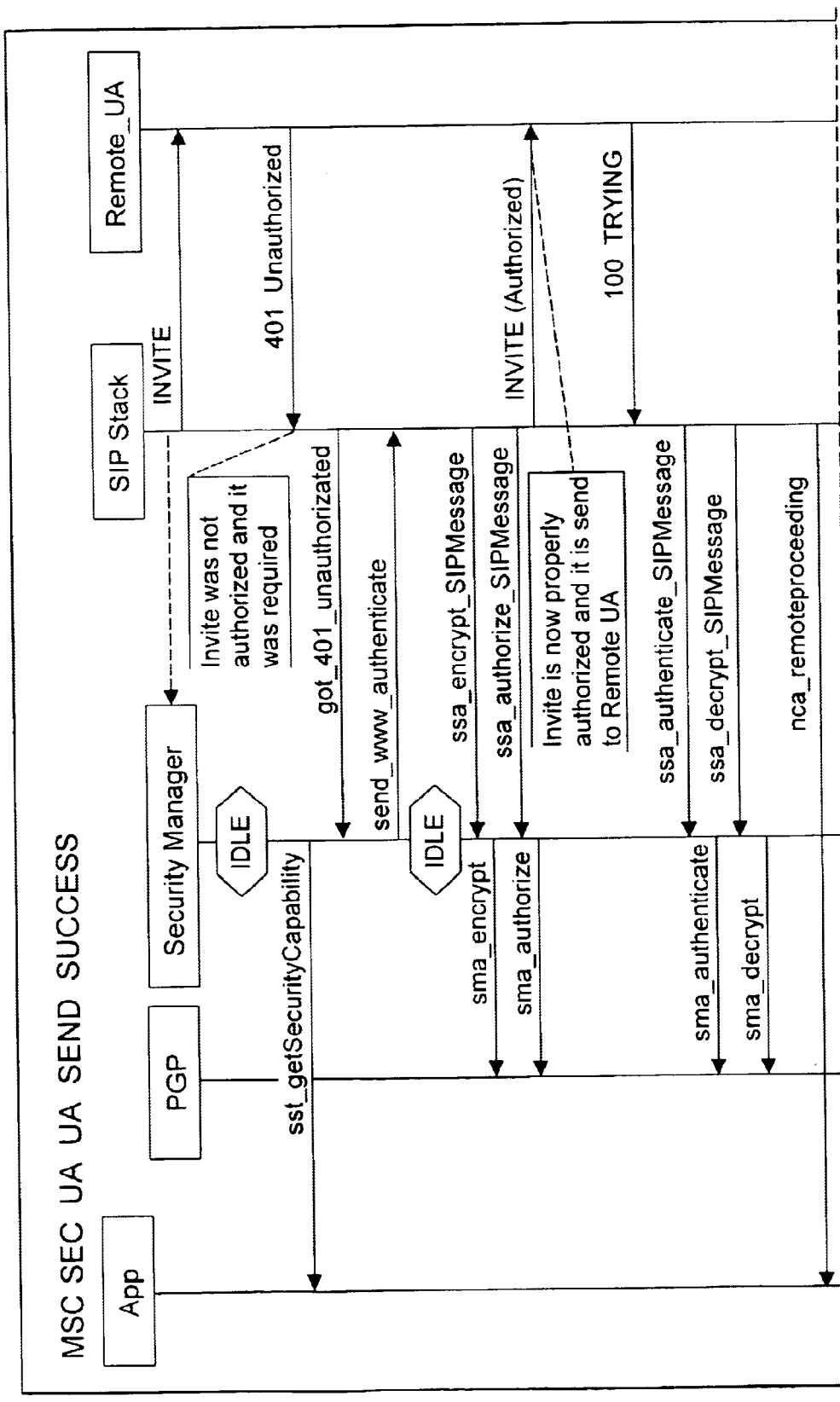
FIGS. 12(a) and 12(b) together show MSC for call initiation, according to the present invention.
Figure 12B:
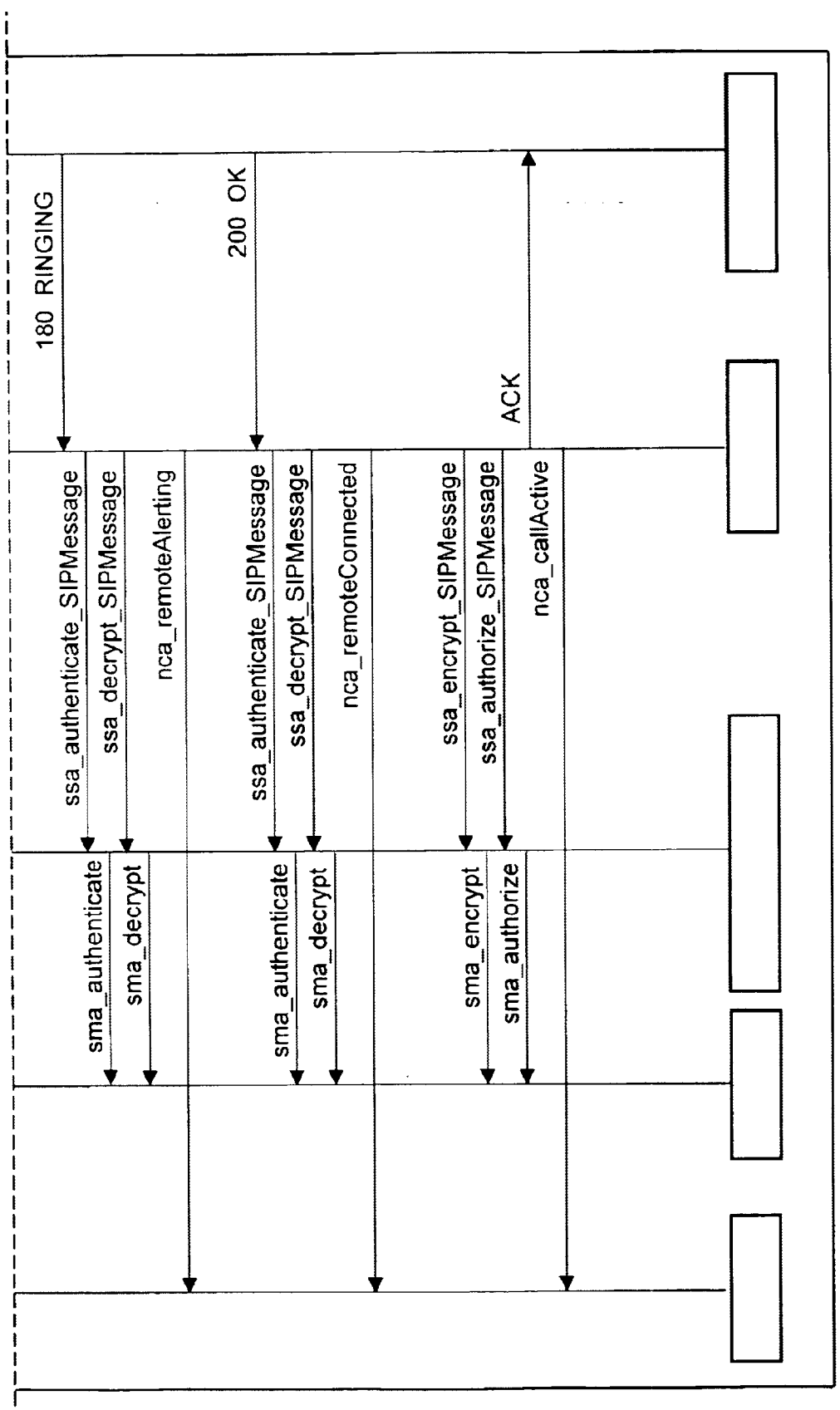

The message sequence charts for both sending an invite and receiving one are presented in FIGS. 12(a) and 12(b) and 13(a) and 13(b). First, as shown in FIG. 12(a), an INVITE is sent to the remote UA. Invite was not authorized and the remote UA indicates that such is required by responding to the SIP stack with a 401 Unauthorized. The message is identified at the lowest level of the stack and the got_unauthorized signal is sent to the security manager as shown in FIGS. 12(a) and 14(c). The Security Manager performs the task of adding the required information, i.e., an Authorization header field, and sends the signal send_www_authenticate back to the stack, as shown in FIG. 12(a). At the stack's send function, ssa_encrypt and ssa_authorize functions are called, the message is encrypted and the proper values to the Authorization header fields are added. During all this time the security manager remains in the idle state as shown in FIG. 14(c). A new INVITE with authorization is sent to the remote UA as shown in FIGS. 12(a) & 14(c). The Remote UA accepts the authorization and responds with the 180 Ringing message as shown in FIG. 12(b). The received message is authenticated and decrypted and sent to the upper layer of the stack for call control signalling. After this phase the call proceeds normally with proper security mechanisms.

Figure 13A:
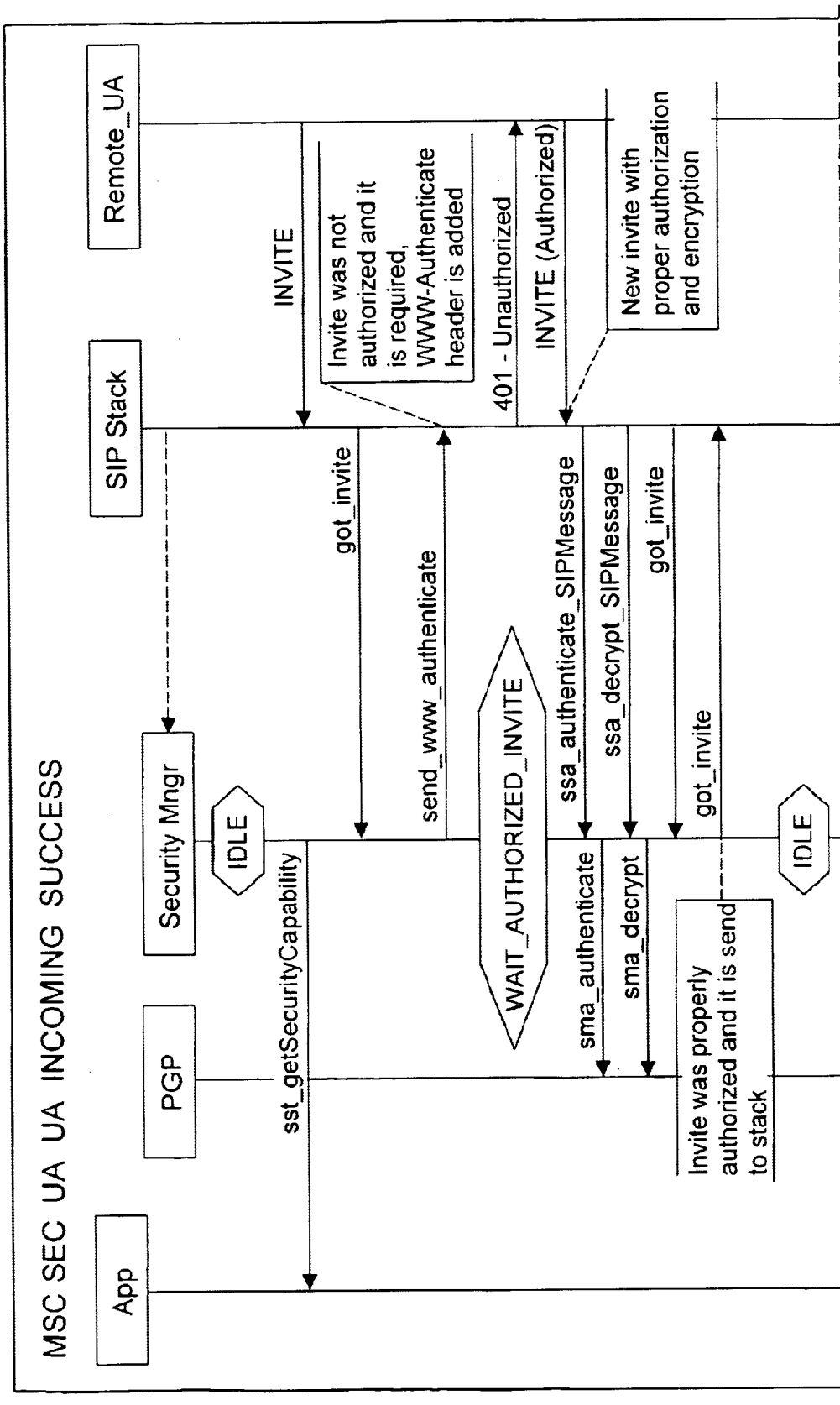
Figure 13B:
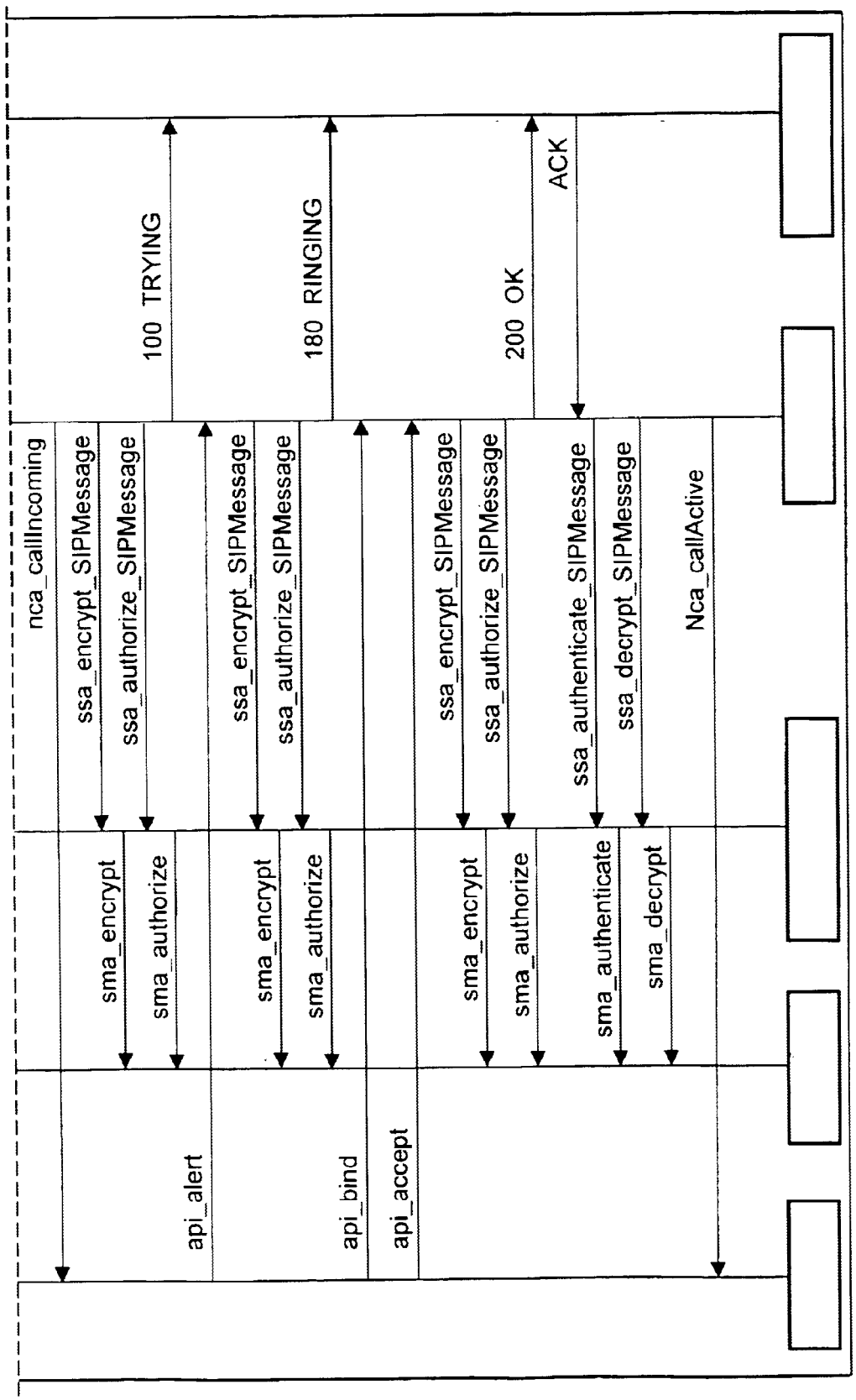

When an INVITE is received, as shown in FIG. 13(a), the stack always sends the got_invite signal to the security manager (see also sip_invite in Table 4 and FIG. 14(a)). The security Manager checks if the invite is authorized or not and if it is required. In this case the security manager creates a new 401 Unauthorized message with the WWW-Authenticate header and sends the send_www_authentication signal (as shown in Table 4 and FIGS. 13(a) and 14(a)) to the stack and moves to the wait_auth_invite state. The stack sends an 401 Unauthorized response back to the remote UA as shown in FIG. 13(a). A new INVITE is received (sip_invite, see Table 4 and FIG. 14(b)) and got_invite is sent to the security manager (FIG. 13(a)). Again the security manager checks the invite, this time it is properly authorized and it is forwarded to the stack for call control. After this phase the call proceeds normally with proper security mechanisms. Also shown in Table 4 and FIG. 14(b) is the case where a got_error signal is received while the security manager is in the wait_auth_invite state.

What is claimed is:

1. A modular component for use in conjunction with a protocol stack of a voice over internet protocol (VoIP) terminal, comprising:

a security manager;

a security stack interface (SSA) for interfacing between said security manager and a protocol manager of said protocol stack;

a security terminal interface (SST) for interfacing between said security manager and an application layer;

a security media interface (SSM) for interfacing between said security manager and a media controller; and a security manager application interface (SMA) for interfacing between said security manager and a security application (PGP) outside said stack.

2. The modular component of claim 1, wherein said security manager comprises a state machine having an idle state and a wait for authorization state.

3. The modular component of claim 2, wherein a transition to said wait authorization state from said idle state occurs in response to an unauthorized invitation received and signaled from and to an initiating remote device wherein a transition from said wait authorization state to said idle state occurs in response to an authorized invitation.

4. A session initiation protocol (SIP) signaling stack for a voice over internet protocol (VoIP) terminal device, said stack having an application interface and a media interface to a telephony application and having a protocol interface to a network layer, said stack comprising:

an SIP manager having said application interface and a media controller having said media interface to said telephony application and said protocol interface between said network layer and both said SIP manager and said media controller; and a security manager having a plurality of interfaces to said SIP manager, said telephony application, and to said network layer.

5. The SIP stack of claim 4, wherein said plurality of interfaces includes:

(i) a security stack interface (SSA) between said SIP manager and said security manager;

(ii) a security terminal interface (SST) between said telephony application and said security manager;

(iii) a security media interface (SSM) between said security manager and said media controller;

(iv) a security manager application interface (SMA) between said security manager and a security application (PGP) outside said stack.

6. Method, comprising the steps of:

sending an invite signal from a session initiation protocol (SIP) stack of a sending terminal to a remote user agent (UA);

receiving an unauthorized signal (401_Unauthorized) at said SIP stack from said remote UA indicating authorization is required;

providing an indication signal (got_401_unauthorized) from said SIP stack to a security manager module of said sending terminal indicative of receipt of said unauthorized signal;

providing an authenticate signal (send_www_authenticate) with required information and authorization header field from said security manager module to said SIP stack;

calling encryption and authorization function requests from said SIP stack to said security manager;

encrypting and authorizing said required information; and sending an authorized invite signal from said SIP stack to said remote UA.

7. Method, comprising the steps of:

receiving an invite signal from a remote user agent (UA) at a session initiation protocol (SIP) stack of a receiving terminal;

providing a signal indicative of receipt of said invite signal from said SIP stack to a security manager module of said receiving terminal for checking security parameters of said invite signal;

providing an authenticate signal (send_www_authenticate) from said security manager to said SIP stack;

sending an unauthorized signal (401_unauthorized) from said SIP stack to said remote UA;

receiving an authorized invite signal from said remote UA to said SIP stack;

providing a request to authenticate said authorized invite signal to said security manager module;

checking parameters of said authorized invite signal by said security manager module; and providing an authentication signal from said security manager module to said SIP stack indicative of said step of checking.

8. A telecommunications system, comprising:

a sending terminal for sending an invite signal from a session initiation protocol (SIP) stack of a sending terminal; and a receiving terminal responsive to said invite signal for providing a signal indicative of receipt of said invite signal from said SIP stack to a security manager module of said receiving terminal for checking security parameters of said invite signal, wherein said security manager provides an authenticate signal to said SIP stack and said SIP then sends an unauthorize signal to said sending terminal in the presence of an unauthorized invite signal from said sending terminal, wherein said SIP stack of said sending terminal is responsive to said unauthorized signal from said receiving terminal indicating authorization is required, and wherein said sending terminal provides an indication signal from said SIP stack of said sending terminal to a security manager module of said sending terminal indicative of receipt of said unauthorize signal, wherein said security manager provides an authenticate signal with required information and authorization header field to said SIP stack of said sending terminal, wherein said SIP stack of said sending terminal sends an authorized invite signal to said receiving terminal, wherein said receiving terminal receives said authorized invite signal from said sending terminal at said SIP stack of said receiving terminal, wherein said SIP stack provides a request to authenticate said authorized invite signal to said security manager module of said receiving terminal, wherein said security manager checks parameters of said authorized invite signal and provides an authentication signal to said SIP stack of said receiving terminal indicative of said step of checking.

* * * * *